US007567564B2

(12) United States Patent　　(10) Patent No.: 　　US 7,567,564 B2
Tanaka　　(45) Date of Patent: 　　Jul. 28, 2009

(54) OPTICAL ACCESS NETWORK APPARATUS AND DATA SIGNAL SENDING METHOD THEREFOR

(75) Inventor: Masashi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 526 days.

(21) Appl. No.: 11/507,229

(22) Filed: Aug. 21, 2006

(65) Prior Publication Data

US 2007/0064719 A1　　Mar. 22, 2007

(30) Foreign Application Priority Data

Aug. 25, 2005　(JP)　............................. 2005-244868

(51) Int. Cl.
*H04L 12/56*　(2006.01)
*H04L 12/26*　(2006.01)
*H04J 3/02*　(2006.01)
*H04J 14/00*　(2006.01)

(52) U.S. Cl. ........................ 370/389; 370/230; 370/537; 398/45; 398/66

(58) Field of Classification Search ......... 370/229–238, 370/351, 389–392, 395.31, 395.51, 537; 398/43–46, 58–64, 66–67, 76

See application file for complete search history.

(56) References Cited

U.S. PATENT DOCUMENTS

2007/0025352 A1* 2/2007 Tanaka ........................ 370/390

2007/0025734 A1* 2/2007 Oogushi et al. ............... 398/71
2007/0133576 A1* 6/2007 Tsuge et al. ................. 370/401
2008/0138072 A1* 6/2008 Sakamoto et al. ............. 398/68

FOREIGN PATENT DOCUMENTS

JP　　2003-111116　　4/2003
JP　　2003-318933　　11/2003

* cited by examiner

*Primary Examiner*—Tri H Phan
(74) *Attorney, Agent, or Firm*—Scully, Scott, Murphy & Presser, P.C.

(57) ABSTRACT

The present invention realizes an Optical Line Terminal (OLT) in an optical access network and a data signal sending method for the optical access network in which the reliability of the network can be assured without increasing the cost of facility investment. The OLT comprises a multiplex control unit for providing a communication path to be used commonly for transmitting data signals for subscriber terminals to communicate with the network, a plurality of optical network interface units, each accommodates the subscriber terminals and provides either a first path connected to the network for transmitting the data signals individually or a second path connected to the multiplex control unit for transmitting the data signals to the network commonly with data signals from other subscriber terminals accommodated in other optical network interface unit, and a path selection control section, which determines for every optical network interface unit to select either the first path or the second path on the basis of path class information in a path management table in which respective path class information for every optical network interface unit have been predetermined and set.

16 Claims, 30 Drawing Sheets

| CARD NUMBER | CARD TYPE | PATH CLASS |
|---|---|---|
| 0 | MUX/CTL | CONCENTRATE |
| 1 | PON I/F | CONCENTRATE |
| 2 | PON I/F | CONCENTRATE |
| 3 | PON I/F | CONCENTRATE |
| 4 | PON I/F | CONCENTRATE |
| 5 | PON I/F | NON-CONCENTRATE |
| 6 | PON I/F | CONCENTRATE |
| 7 | PON I/F | NON-CONCENTRATE |
| 8 | PON I/F | CONCENTRATE |
| m | PON I/F | NON-CONCENTRATE |
| ⋮ | ⋮ | ⋮ |
| n-1 | PON I/F | NON-CONCENTRATE |
| n | PON I/F | NON-CONCENTRATE |

(PON INTERFACE BOARD PATH MANAGEMENT TABLE)

FIG.4

| CARD NUMBER (242) | CARD TYPE (243) | PATH SELECTION POLICY (401) | PATH SELECTION ID (402) | PATH CLASS (244) |
|---|---|---|---|---|
| 0 | MUX/CTL | - | - | CONCENTRATE |
| 1 | PON I/F | CARD | - | CONCENTRATE |
| 2 | PON I/F | VLAN | 10 | CONCENTRATE |
| | | VLAN | 20 | CONCENTRATE |
| | | OTHERS | - | NON-CONCENTRATE |
| 3 | PON I/F | ONU | 1 | CONCENTRATE |
| | | ONU | 30 | CONCENTRATE |
| | | OTHERS | - | NON-CONCENTRATE |
| 4 | PON I/F | PROTOCOL | PPP | NON-CONCENTRATE |
| | | PROTOCOL | IGMP | CONCENTRATE |
| | | OTHERS | - | NON-CONCENTRATE |
| 5 | PON I/F | LLID | 20 | CONCENTRATE |
| | | LLID | 40 | CONCENTRATE |
| | | OTHERS | - | NON-CONCENTRATE |
| ⋮ | ⋮ | ⋮ | ⋮ | ⋮ |
| n | PON I/F | CARD | - | NON-CONCENTRATE |

(PATH MANAGEMENT TABLE WITH PATH SELECTION POLICY)

FIG.8

| CARD NUMBER | CARD TYPE | PATH CLASS | MULTIPLEX CONTROL BOARD FUNCTION VALID POLICY |
|---|---|---|---|
| 0 | MUX/CTL | CONCENTRATE | ON |
| 1 | PON I/F | CONCENTRATE | OFF |
| 2 | PON I/F | CONCENTRATE | OFF |
| 3 | PON I/F | CONCENTRATE | OFF |
| 4 | PON I/F | CONCENTRATE | ON |
| 5 | PON I/F | NON-CONCENTRATE | OFF |
| 6 | PON I/F | CONCENTRATE | ON |
| 7 | PON I/F | NON-CONCENTRATE | OFF |
| 8 | PON I/F | CONCENTRATE | ON |
| m | PON I/F | CONCENTRATE | ON |
| ... | ... | ... | ... |
| n | PON I/F | NON-CONCENTRATE | ON |

(PATH MANAGEMENT TABLE WITH MULTIPLEX CONTROL BOARD FUNCTION VALID POLICY)

FIG.11

| CARD NUMBER | CARD TYPE | PATH CLASS | FIRST REDUNDANT OPERATION MODE |
|---|---|---|---|
| 0 | MUX/CTL | CONCENTRATE | ON |
| 1 | PON I/F | CONCENTRATE | OFF |
| 2 | PON I/F | CONCENTRATE | OFF |
| 3 | PON I/F | CONCENTRATE | OFF |
| 4 | PON I/F | CONCENTRATE | OFF |
| 5 | PON I/F | NON-CONCENTRATE | ON |
| 6 | PON I/F | CONCENTRATE | OFF |
| 7 | PON I/F | NON-CONCENTRATE | ON |
| 8 | PON I/F | CONCENTRATE | OFF |
| 9 | PON I/F | NON-CONCENTRATE | ON |
| ... | ... | ... | ... |
| n | PON I/F | NON-CONCENTRATE | ON |

(PATH MANAGEMENT TABLE WITH FIRST REDUNDANT POLICY)

| PATH CLASS |
|---|
| CONCENTRATE |

FIG.21

| CARD NUMBER | CARD TYPE | PATH CLASS | SECOND REDUNDANT OPERATION MODE |
|---|---|---|---|
| 0 | MUX/CTL | CONCENTRATE | ON |
| 1 | PON I/F | CONCENTRATE | OFF |
| 2 | PON I/F | CONCENTRATE | OFF |
| 3 | PON I/F | CONCENTRATE | OFF |
| 4 | PON I/F | CONCENTRATE | OFF |
| 5 | PON I/F | NON-CONCENTRATE | ON |
| 6 | PON I/F | CONCENTRATE | OFF |
| 7 | PON I/F | NON-CONCENTRATE | ON |
| 8 | PON I/F | CONCENTRATE | OFF |
| 9 | PON I/F | NON-CONCENTRATE | ON |
| ... | ... | ... | ... |
| n | PON I/F | PROTECTION | ON |

| REDUNDANT PATH CLASS |
|---|
| CARD N |

(PATH MANAGEMENT TABLE WITH SECOND REDUNDANT POLICY)

FIG.26

OPTICAL ACCESS NETWORK APPARATUS AND DATA SIGNAL SENDING METHOD THEREFOR

BACKGROUND OF THE PRESENT INVENTION

1. Field of the Present Invention

The present invention relates to an optical access network apparatus and its data signal sending method, and more particularly to an OLT (Optical Line Terminal) in an optical access network and a data signal sending method for enabling a subscriber terminal to send a data signal via the OLT to a network.

2. Description of the Related Art

An xDSL (x-Digital Subscriber Line) is the generic term of ADSL (Asymmetric Digital Subscriber Line), HDSL (High-bit-rate DSL), RADSL (Rate-Adaptive DSL), SDSL (Symmetric DSL), and VDSL (Very-high-bit-rate DSL). This xDSL is a modem technique allowing for the fast packet communications at several tens Megabits/sec at maximum, using the existing subscriber line (ordinary telephone cable made of copper wire) as a transmission line. Due to the introduction of communication services employing the xDSL, a high-speed and always-connected internet access network has become popular and widely spread.

However, as the xDSL technology involves the packet communication using the telephone cable, it has a problem that the transmission characteristics and the data transmission speed are affected by the length of the telephone cable, the characteristics of the telephone cable, and the peripheral environmental conditions of wiring path of the telephone cable from a telephone switching office to the subscriber's premises.

Thus, an access network employing the optical technologies has been widely spreading, instead of the access network employing the xDSL technology. The access network employing the optical technologies is an optical access network so called an EPON (Ethernet Passive Optical Network) which employs the Ethernet technologies and realizes the packet communication through an optical cable connected to the subscriber's premises. The PON technology is recommended in the IEEE (The Institute of Electrical and Electronics Engineers, Inc.) 802.3ah.

The optical access network by the EPON is composed of an OLT (Optical Line Terminal) that is installed in the switching center of a communication common carrier, and an ONU (Optical Network Unit) that is installed in the subscriber's premises. This optical access network is constructed by laying one optical fiber cable to an area in which plural subscribers' premises are locating, connecting a splitter as an optical coupler to the optical fiber cable for splitting an optical path into a plurality of optical paths, and connecting each of split optical cables to respective subscriber's premises. The optical access network can provide the subscriber with the packet communications of wider band and higher quality than the access network with the metallic cable such as the telephone cable. Particularly, the optical access network is most suitable for an application such as the moving picture contents distribution services.

On the other hand, in the communications network, it is necessary to secure the high speed and high quality communications, and it is also important to maintain the reliability of the network by increasing the tolerance or taking measures against the line disturbances. Therefore, the techniques for the dual or redundant configuration of the network have been developed in the optical access network. One of those techniques is disclosed in Japanese Patent Application Laid-Open No. 2003-111116 as a system which performs redundant line selection in order to equalize the frequency of line usage. Also, in Japanese Patent Application Laid-Open No. 2003-318933, a proposal has been made for a system which has a redundant configuration of the active line and the standby line, and diverts a part of data to the standby line when amount of the input data has exceeded beyond the band assured by the active line.

The configuration of an optical access network based on the functions of the conventional OLT will be described below.

The conventional OLT has a SNI (Service Node Interface) port corresponding to each PON (Passive Optical Network) interface for connection to the network. The OLT accommodates a plurality of PON interfaces (or mounts a plurality of PON interface boards), and their respective SNI ports are connected corresponding one to one to the ports of an L2 (layer 2) switch provided in the network. That is, in a case where the OLT mounts twelve PON interface boards and provides twelve SNI ports, the twelve SNI ports are connected to the L2 switch of the network.

FIG. 29 is a system block diagram representing the essence of an example of the conventional optical access network of non-concentrate type.

An OLT 101 of the conventional optical access network comprises a control board 102 for controlling the entire apparatus (the OLT 101), and n (n is arbitrary integer) PON interface (PON I/F) boards $103_1$, $103_2$, . . . and $103_n$. This conventional optical access network is composed of a network element of subscriber side and a network element of network side. The network element of subscriber side comprises the optical fiber cables $104_1$, $104_2$, . . . and $104_n$ connecting to the respective PON interface boards $103_1$, $103_2$, . . . and $103_n$ in the OLT 101, the 1×N splitters $105_1$, $105_2$, . . . and $105_n$ for splitting each of the optical fiber cables $104_1$, $104_2$, . . . and $104_n$ into N (N is arbitrary integer) split optical cables for subscribers, not shown, and n×N ONUs $106_{11}$ to $106_{1N}$, $106_{21}$ to $106_{2N}$, . . . and $106_{n1}$ to $106_{nN}$ connected to the respective 1×N splitters $105_1$, $105_2$, . . . and $105_n$ through the split optical cables. And the network element of network side is configured such that the SNI ports $108_1$, $108_2$, . . . and $108_n$, which are interfaces on the network side of the PON interface boards $103_1$, $103_2$, . . . and $103_n$ in the OLT 101, are connected to an L2 switch (L2 SW) 109 of the network.

In the configuration of the conventional optical access network in FIG. 29, data is transmitted or received between the subscriber terminal, not shown, and the network on the paths as indicated by the arrow $111_1$, $111_2$, . . . and $111_n$. That is, data is transmitted or received via the L2 switch 109, the SNI ports $108_1$, $108_2$, . . . and $108_n$ of the OLT 101, the PON interface boards $103_1$, $103_2$, . . . and $103_n$, the optical fiber cables $104_1$, $104_2$, . . . and $104_n$ and the ONUs $106_{11}$ to $106_{1N}$, $106_{21}$ to $106_{2N}$, . . . and $106_{n1}$ to $106_{nN}$.

On the other hand, FIG. 30 is a system block diagram representing the essence of an example of the conventional optical access network of concentrate type. The same parts are given the same numerals throughout FIGS. 29 and 30, and the explanation of the same parts is omitted properly.

An OLT 121 of the conventional optical access network as shown in FIG. 30 comprises a multiplex board 122 for controlling the entire apparatus (the OLT 121) and multiplexing the data from the subscriber terminals, and n PON interface boards $103_1$, $103_2$, . . . and $103_n$. This conventional optical access network is composed of a network element of subscriber side and a network element of network side. As the configuration of the network element of subscriber side is the same as that shown in FIG. 29, the explanation is omitted. The network element of network side is configured such that an SNI port 123 that is an interface on the network side of the multiplex board 122 is connected to the L2 switch 109.

In the configuration of the conventional optical access network as shown in FIG. 30, data is transmitted or received on the paths as indicated by the arrow 131 and arrow 132$_1$, arrow 131 and arrow 132$_2$, . . . , and arrow 131 and arrow 132$_n$ between the subscriber terminal, not shown, and the network. That is, data is transmitted or received via the L2 switch 109, the SNI port 123 of the OLT 121, the PON interface boards 103$_1$, 103$_2$, . . . and 103$_n$, the optical fiber cables 104$_1$, 104$_2$, . . . and 104$_n$ and the ONUs 106$_{11}$ to 106$_{1N}$, 106$_{21}$ to 106$_{2N}$, . . . and 106$_{n1}$ to 106$_{nN}$.

In FIGS. 29 and 30, the section of the optical fiber cable between the PON interface boards and the ONUs is called "a PON section".

In the PON system for the optical access network, some measures for providing a duplex system that enables the switching of the PON section at the time of line disturbances have been conventionally proposed. However, no system has been proposed yet for protecting a portion relating to the PON interface boards and the SNI ports at the time of fault. Thereby, the following problems arise.

A first problem is that the cost of facility investment is increased when redundant configuration facilities are provided for the network element of network side in the conventional optical access network of non-concentrate type.

The conventional OLT 101 of non-concentrate type comprises the SNI ports 108$_1$, 108$_2$, . . . and 108$_n$ corresponding to the PON interface boards 103$_1$, 103$_2$, . . . and 103$_n$, as shown in FIG. 29. Therefore, various facilities are required doubly by simply making the apparatus duplex, so that the cost of equipment is increased.

A second problem is that the conventional OLT 201 of concentrate type cannot separate the data traffic for transmission depending on the type of subscriber (or subscriber class). To assure the service quality for the respective subscribers, it is required to separate the data traffic for transmission depending on the subscriber class.

The conventional OLT 201 of concentrate type concentrates the data traffic for the PON interface boards 103$_1$, 103$_2$, . . . and 103$_n$ in the multiplex board 122 with a single SNI port 123, as shown in FIG. 30, whereby the duplex provision of multiplex board is possible for realizing a redundant configuration. However, the redundant configuration of the multiplex board will cause the complex settings of internal control and troublesome operation for quality assurance in assuring the quality of data depending on the subscriber class.

A third problem is that the degree of freedom of setting a path to the network for each subscriber or service is lowered in the both forms of the non-concentrate type and the concentrated type. That is, there are physical separation and logical separation for routing the data corresponding to each subscriber. The physical routing is generally made by the physically independent SNI ports, and the logical routing is generally made by a general VLAN (Virtual Local Area Network) tag. However, these routing methods must accord with a management scheme dependent upon the topology of the OLTs 101 and 121 (FIGS. 29 and 30) connecting to the network.

SUMMARY OF THE PRESENT INVENTION

An exemplary feature of the present invention is to provide an Optical Line Terminal (OLT) in an optical access network and a data signal sending method for the optical access network in which the reliability of the network can be assured without increasing the cost of facility investment. It is another exemplary feature of the present invention to provide an OLT in an optical access network and a data signal sending method for the optical access network in which the data received from the subscriber terminal can be flexibly routed for each subscriber or each service.

The Optical Line Terminal (OLT) according to the present invention comprises a multiplex control unit for providing a communication path to be used commonly for transmitting data signals for subscriber terminals to communicate with the network, a plurality of optical network interface units, each accommodates the subscriber terminals and provides either a first path connected to the network for transmitting the data signals individually or a second path connected to the multiplex control unit for transmitting the data signals to the network commonly with data signals from other subscriber terminals accommodated in other optical network interface unit, and a path selection control section, which determines for every optical network interface unit to select either the first path or the second path on the basis of path class information in a path management table in which respective path class information for every optical network interface unit have been predetermined and set.

According to the present invention, the data signal of the subscriber terminal is received via the PON interface, and the path management table is referred to, whereby when this data signal is transmitted to the network, it is possible to select a way of transmitting the data signal, i.e. concentrate or non-concentrate. That is, the path can be flexibly set by arranging the internal data of the OLT without depending on the physical topology between the subscriber and the network. Accordingly, the communication common carrier (or the network provider) can simplify the network path design for the optical access network to a network, whereby the convenience or easiness of the facility maintenance management is improved.

BRIEF DESCRIPTION OF THE DRAWINGS

Exemplary features and advantages of the present invention will become apparent from the following detailed description when taken with the accompanying drawings in which:

FIG. 4 is an explanatory view showing the contents of a path management table according to the first embodiment;

FIG. 8 is an explanatory view showing the contents of a path management table according to the second embodiment;

FIG. 11 is an explanatory view showing the contents of a path management table according to the third embodiment;

FIG. 21 is an explanatory view showing the contents of a path management table according to the fourth embodiment;

FIG. 26 is an explanatory view showing the contents of a path management table according to the fifth embodiment;

DESCRIPTION OF THE PREFERRED
EMBODIMENTS

The present invention will be described below in connection with the five exemplary embodiments.

Exemplary Embodiment 1

Figure 1:
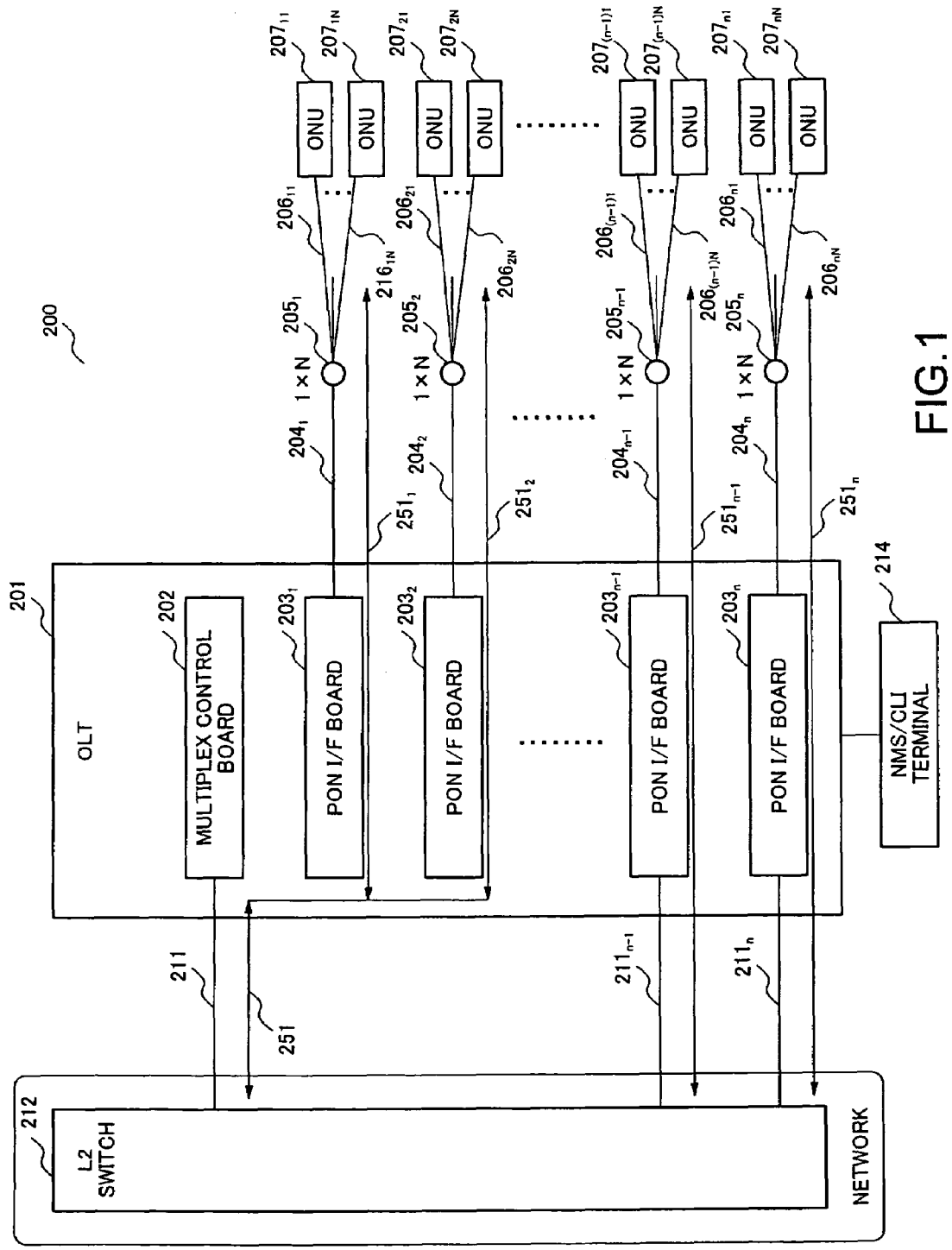
FIG. 1 is a system block diagram representing the essence of an optical access network according to a first embodiment of the present invention.

FIG. 1 is a system block diagram schematically representing the essence of an optical access network according to a first embodiment of the present invention. The optical access network 200 of this embodiment constitutes a GEPON (Gigabit Ethernet Passive Optical Network) system as an example.

In the optical access network 200 of this embodiment, an OLT 201 comprises a multiplex control board 202 and n (n is arbitrary integer) PON interface (I/F) boards $203_1$, $203_2$, ... and $203_n$. One ends of the optical fiber cables $204_1$, $204_2$, ... and $204_n$ are correspondingly connected to the PON interface boards $203_1$, $203_2$, ... and $203_n$, and the other ends of the optical fiber cables $204_1$, $204_2$, ... and $204_n$ are connected to the 1×N splitters $205_1$, $205_2$, ... and $205_n$, and each optical fiber cable is split into N (N is arbitrary integer) optical fiber cables by the 1×N splitter. The split optical fiber cables $206_{11}$ to $206_{1N}$, $206_{21}$ to $206_{2N}$, ... and $206_{n1}$ to $206_{nN}$ are connected to the respective ONUs $207_{11}$ to $207_{1N}$, $207_{21}$ to $207_{2N}$, ... and $207_{n1}$ to $207_{nN}$.

On the network side of the OLT 201, an SNI port 211 that is an interface on the network side of the multiplex control board 202 and the SNI ports $211_{n-1}$ and $211_n$ that are interfaces on the network side of the PON interface boards $203_{n-1}$ and $203_n$ are connected to an L2 switch (SW) 212.

Though not shown in FIG. 1, an STB (Set Top Box) and a television or personal computer for receiving a large amount of contents broadcasted by a multicast service, and a subscriber terminal such as a VoIP (Voice over IP) service terminal are connected to the ONUs $207_{11}$ to $207_{1N}$, $207_{21}$ to $207_{2N}$, ... and $207_{n1}$ to $207_{nN}$.

Also, the OLT 201 is connected to an NMS (Network Management System) or a CLI (Command Line Interface) (hereinafter referred to as an NMS/CLI terminal 214) for performing the control management of the optical access network. In the drawing, it is shown that the NMS/CLI terminal 214 is directly connected to the OLT 201, but the NMS/CLI terminal 214 can be connected via a network to the OLT 201 in the actual operation to perform the control management. This NMS/CLI terminal 214 comprises a recording medium, not shown, storing a control program for performing various controls such as the initialization of the OLT 201, and a CPU (Central Processing Unit) for executing this program.

The section composed of the optical fiber cables 204, the 1×N splitter for splitting the optical fiber cables and the optical fiber cables 206 having one ends connected to the splitter 205 is generically referred to as "a PON section".

Figure 2:
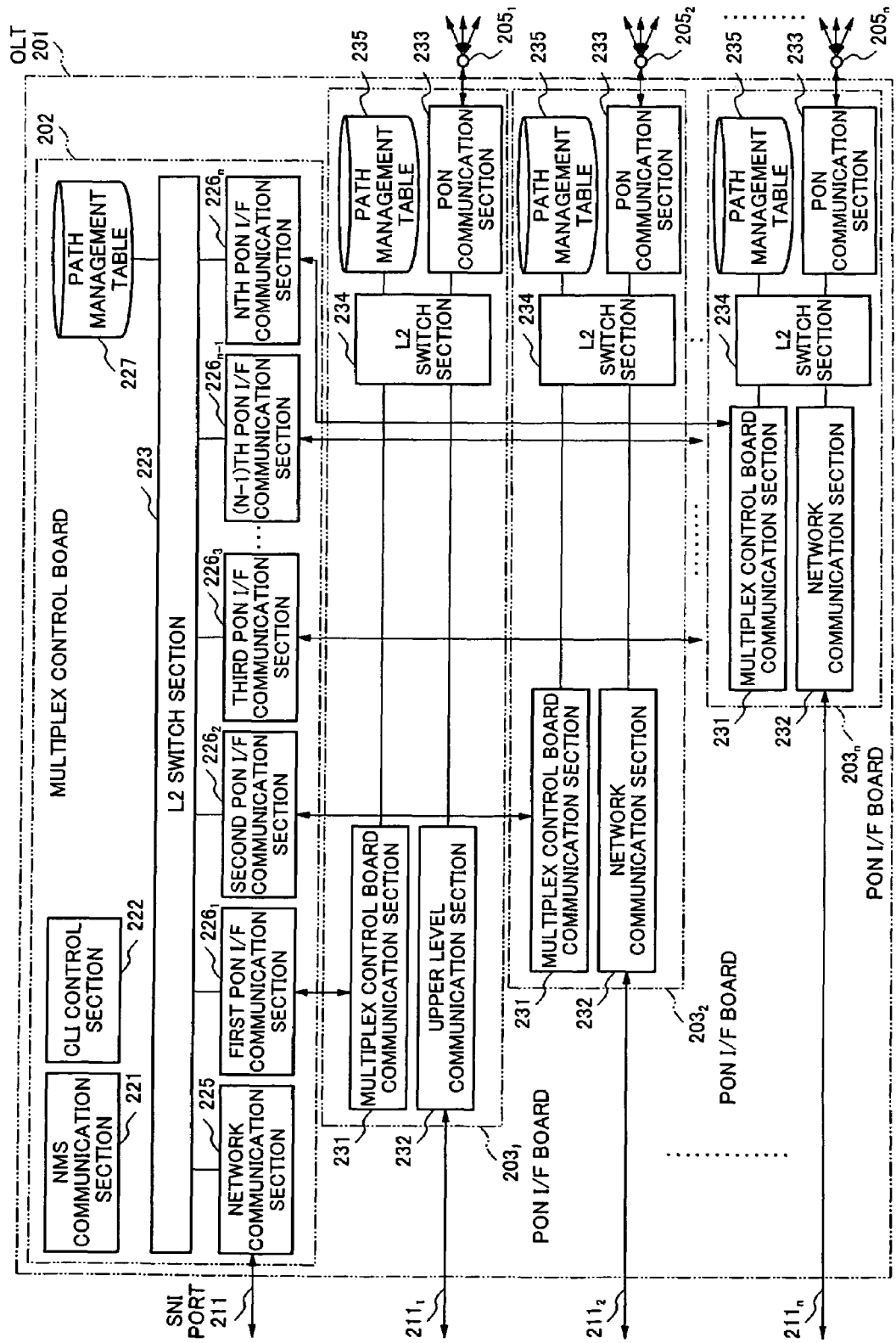
FIG. 2 is a block diagram representing the specific configuration of an OLT according to the first embodiment.

FIG. 2 is a block diagram representing the specific configuration of the OLT 201.

The component units of the multiplex control board 202 of the OLT 201 are as follows.

An NMS communication section 221 (performing the communications with the NMS/CLI terminal 214, shown in FIG. 1, for control management), a CLI control section 222 (performing an interface process with the NMS/CLI terminal 214), a universal L2 (layer 2) switch section 223 (performing a data transfer switching process within the multiplex control board for the data input from the subscriber terminal or the network by establishing a switched path), a network communication section 225 (performing the communications with the network with a function of the SNI port 211 of the multiplex control board 202), the first to nth PON interface (I/F) communication sections $226_1$, $226_2$, ... and $226_n$, (performing the communications with the PON interface boards $203_1$, $203_2$, ... and $203_n$ mounted on the OLT 201), and a path management table 227 (storing the path control information for setting the path of data passing through the OLT 201 corresponding to the PON interface board).

Also, each of the PON interface boards $203_1$, $203_2$, ... and $203_n$, mounted on the OLT 201 has the following component units.

A multiplex control board communication section 231 (performing the communications with the PON interface (I/F) communication section of the multiplex control board 202, corresponding to the PON interface board), a network communication section 232 (performing the communications with the network with a function of the SNI ports $211_1$, $211_2$, ... and $211_n$ of the PON interface boards $203_1$, $203_2$, ... and $203_n$), a PON communication section 233 (performing the data communication via the PON section with conforming to the IEEE (The Institute of Electrical and Electronics Engineers, Inc.) 802.3a, and identifying the information contained in the up-stream data packet), an L2 (layer 2) switch section 234 (performing a data transfer switching process within the PON interface board for the data input from the subscriber terminal or the network by establishing a switched path), and a path management table 235 (storing the path control information concerning the PON interface board extracted from the contents of the path management table 227 in the multiplex control board 202).

Here, in FIG. 1, the line for connecting the SNI port directly to the L2 switch 212 of the network, is not shown for the PON interface board $203_1$ and $203_2$. On the contrary, in FIG. 2, the SNI ports $211_1$ and $211_2$ are illustrated as if the lines for the SNI ports $211_1$ and $211_2$ existed in the PON interface board $203_1$ and $203_2$. This means that the data received from the subscriber terminal can be controlled to be directly transmitted to the SNI port of the own PON interface board, or concentrated in the multiplex control board 202 and transmitted via the SNI port of the multiplex control board, depending on the settings of the path management table contents for the OLT in this embodiment, as will be described later.

The operation of the optical access network as shown in FIGS. 1 and 2 will be described below.

Figure 3:
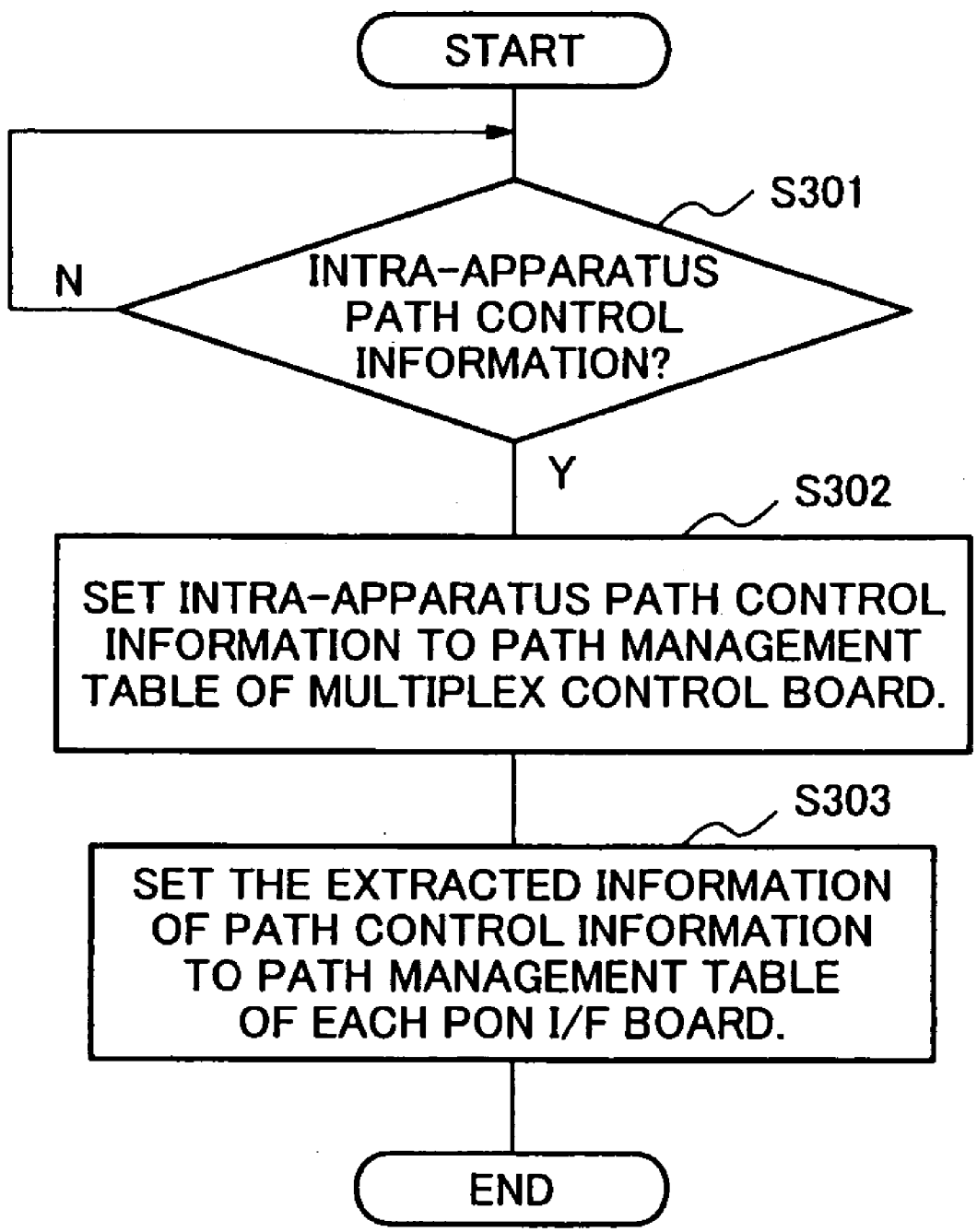
FIG. 3 is a flowchart showing an initialization process of the OLT by an NMS/CLI according to the first embodiment.

In operating the optical access network according to the present invention, an initialization process for initializing the information required for the OLT 201 is performed beforehand. This initialization process is performed by the NMS/CLI terminal 214 (shown in FIG. 1), and each contents of the path management table 227 in the multiplex control board and the path management table 235 in the respective PON interface boards will be set by this initialization process. FIG. 3 is a flowchart showing the initialization process for the OLT by the NMS/CLI terminal according to the first embodiment.

The OLT 201 monitors the information sent from the NMS/CLI terminal 214 (step S301). If the information having been received is the intra-apparatus path control information (Y), the OLT 201 sets the intra-apparatus path control information received from the NMS/CLI terminal 214 to the path management table 227 in the multiplex control board 202 as contents of the table (step S302). The contents of the path management table 227 includes the intra-apparatus path control information concerning all the PON interface boards mounted on the OLT 201, as shown in FIG. 4. Thereafter, the intra-apparatus path control information corresponding to each PON interface board is extracted from the contents of this path management table 227, and the intra-apparatus path control information corresponding to each PON interface board is set in the path management table 235 in each PON interface board (step S303).

FIG. 4 is an explanatory view showing the table contents of the path management table 227 in the multiplex control board. In the first embodiment, this path management table is called as "a PON interface board path management table". Contents of the PON interface board path management table 241 include a card number 242, a card type 243, and a path class 244, which are associated. Herein the term "card" means the multiplex control board (MUX/CTL) 202 or each of the PON interface boards $203_1$, $203_2$, ... and $203_n$ mounted on the OLT 201 as a physical card. The card type 243 indicates the type of card, i.e. MUX/CTL board or PON interface board. This card type 243 is only required for managing the component information of the apparatus, and represented in the general term. In the path class 244, the "concentrate" indicates "line concentration" which means the data from the subscriber terminals are concentrated at the multiplex control board 202 and transmitted to the network via the SNI port 211 of the multiplex control board 202, and the "non-concentrate" indicates "line non-concentration" which means the data from the subscriber terminal is not concentrated and transmitted to the network via respective SNI ports $211_1$~$211_n$. For example, according to the contents of the PON interface board path management table 241, the PON interface boards $203_1$ to $203_4$, $203_6$ and $203_8$ are set as "concentrate" which means the data from the PON interface boards $203_1$ to $203_4$, $203_6$ and $203_8$ are concentrated in the multiplex control board 202 and transmitted via the SNI port 211 to the network, and the other PON interface boards $203_5$, $203_7$, $203_m$, $203_{n-1}$ and $203_n$ are set as "non-concentrate" which means the data from respective PON interface boards $203_5$, $203_7$, $203_m$, $203_{n-1}$ and $203_n$ is not concentrated and transmitted to the network via respective SNI ports $211_5$, $211_7$, $211_m$, $211_{n-1}$ and $211_n$.

Also, the intra-apparatus path control information corresponding to each PON interface board is extracted from the contents of the PON interface board path management table 241 shown in FIG. 4 and set in each path management table 235 provided in the respective PON interface boards $203_1$, $203_2$, ... and $203_n$. For example, "concentrate" is stored as the information indicating the path class 244 in the path management table 235 of the PON interface board $203_1$.

Next, a data communication path from the network to the subscriber terminal will be described below.

In FIG. 2, the network communication section 225 receives data from the network via the SNI port 211 of the multiplex control board 202, and its data is transferred to the L2 switch section 223. The L2 switch section 223 has a general FDB (Forwarding Data Base), not shown, managed by the L2 switch section 223 itself for establishing the switched path to transfer the data within the multiplex control board. Therefore, the L2 switch section 223 establishes the switched path to transfer the data from the network communication section 225 to the PON interface communication section $226_x$ corresponding to the PON interface board to which the received data is addressed among the first to nth PON interface communication sections $226_1$, $226_2$, ... and $226_n$ by referring to the general FDB.

Then, the PON interface communication section $226_x$ sends this data to the multiplex control board communication section 231 provided in the corresponding PON interface board $203_x$. Each PON interface board 203 also has a L2 switch section 234 which has a general FDB (Forwarding Data Base), not shown, managed by the L2 switch section 234 itself for establishing the switched path to transfer the data within the PON interface board 203. Therefore, the L2 switch section 234 establishes the switched path to transfer the data from the multiplex control board communication section 231 to the PON communication section 233, which is proved in the PON interface board $203_x$, by referring to the general FDB. Thereby, the data is transferred via the PON section to the appropriate ONU 207 (see FIG. 1). The above explanation is an example where the data is transferred via the SNI port 211 for the "concentrate" in the down direction.

Next, an example where the data is transferred in the down direction using the "non-concentrate" port will be described below.

It is assumed that the network communication section 225 of the PON interface board 203$_n$ receives data in the down direction from the network via the SNI port 211$_n$ of the PON interface board 203$_n$.

The network communication section 225 transfers its received data to the L2 switch section 234 of the PON interface board 203$_n$. The L2 switch section 234 establishes the switched path between the network communication section 225 and the PON interface communication section 233 of the PON interface board 203$_n$ by referring to the general FDB for transferring the data to the PON interface communication section 233. Thereby, the data is transferred via the PON section to the appropriate ONU 207.

The operation of the L2 switches 223 and 234 as the universal L2 switches is well known to those skilled in the art, and its detailed explanation is omitted.

Herein, the operation of the PON communication section 233 conforming to the IEEE802.3ah will be described below.

In a network system employing the EPON, one OLT 201 and a plurality of ONUs 207$_{11}$ to 207$_{1N}$, 207$_{21}$ to 207$_{2N}$, ... and 207$_{n1}$ to 207$_{nN}$ realize the Point-to-Multipoint Ethernet connection, employing the logical link identifier (LLID: Logical Link Identifier). This logical link identifier is incorporated by two bytes information into the preamble part of a MAC (Media Access Control) frame in the conventional Ethernet, and used in an EPON section (between the OLT 201 and the ONUs 207$_{11}$ to 207$_{1N}$, 207$_{21}$ to 207$_{2N}$, ... and 207$_{n1}$ to 207$_{nN}$).

In the EPON section, since the light (optical path) is simply split into a plurality of optical paths, even the frame transmitted from the OLT 201 to the specific ONU 207$_{nx}$ will be received by all ONUs 207$_{n1}$ to 207$_{nN}$. Thus, each of the ONUs 207$_{n1}$ to 207$_{nN}$ compares the logical link identifier of the frame with the logical link identifier allocated to itself by referring to the preamble part of the frame transmitted from the OLT 201. As a result, when they are coincide with each other, it is recognized that the frame is addressed to itself, and the frame is taken in as the frame to be received by the ONU 207$_{nx}$. On the contrary, when the logical link identifiers are different, the frame is discarded, because the frame is addressed to the other ONU. In this manner, the OLT 201 and the ONU 207$_{nx}$ emulate the Point-to-Point communication, employing the logical link identifier.

As described above, for the subscriber terminals connected to the ONUs 207$_{11}$ to 207$_{1N}$ and 207$_{21}$ to 207$_{2N}$ accommodated in the PON interface boards 203$_1$ and 203$_2$ that are used for concentration type, the data is transferred from the network to the subscriber terminals through the paths as indicated by the arrow 251, 251$_1$ and 251$_2$ as shown in FIG. 1. That is, the data is transferred from the network to the subscriber terminals via the L2 switch 212 of the network, the SNI port 211 of the multiplex control board 202, the multiplex control board 202, the PON interface boards 203$_1$ and 203$_2$, the PON section corresponding to the PON interface boards 203$_1$ and 203$_2$ and the ONUs 207$_{11}$ to 207$_{1N}$ and 207$_{21}$ to 207$_{2N}$.

On the other hand, for the subscriber terminals connected to the ONUs 207$_{(n-1)1}$ to 207$_{(n-1)N}$ and 207$_{n1}$ to 207$_{nN}$ accommodated in the PON interface boards 203$_{n-1}$ and 203$_n$ that are used for non-concentration type, the data is transferred from the network to the subscriber terminals through the paths as indicated by the arrow 251$_{n-1}$ and 251$_n$ as shown in FIG. 1. That is, the data is transferred from the network to the subscriber terminals via the L2 switch 212, the SNI port 211$_{n-1}$ and 211$_n$ of the PON interface boards, the PON interface boards 203$_{n-1}$ and 203$_n$, the PON section corresponding to the PON interface boards 203$_{n-1}$ and 203$_n$ and the ONUs 207$_{(n-1)1}$ to 207$_{(n-1)N}$ and 207$_{n1}$ to 207$_{nN}$.

In this manner, the data is transmitted in the down direction through the L2 switch process as conventionally well known, regardless of the settings of the intra-apparatus path control information.

Figure 5:
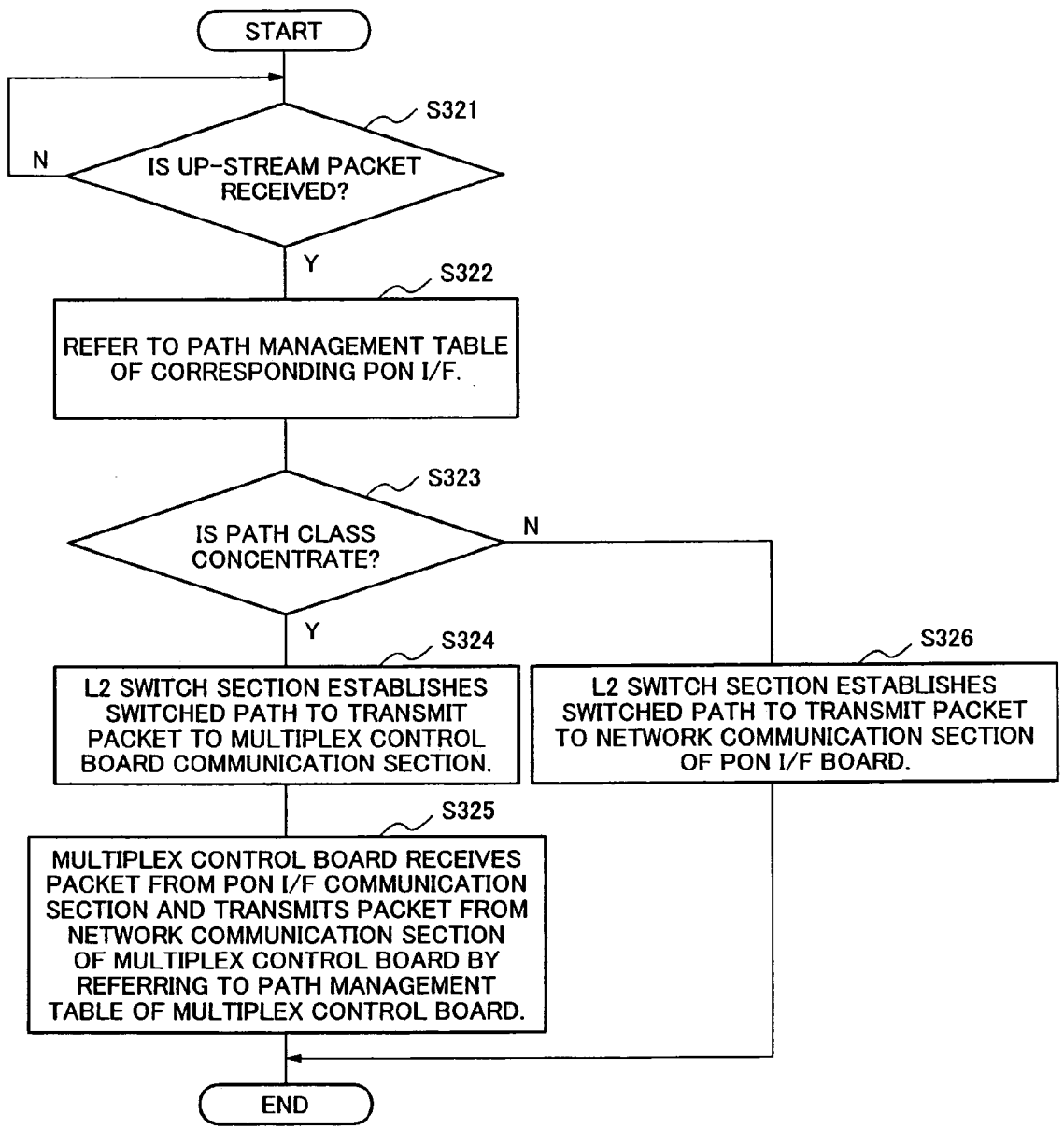
FIG. 5 is a flowchart showing a process of data communication path selection for the up-stream data to the network according to the first embodiment.

FIG. 5 is a flowchart showing a process of setting data communication path in the up direction from the subscriber terminal to the network.

For the process of setting data communication path from the subscriber terminal to the network, it is supposed that the intra-apparatus path control information has already been set in the OLT 201 through the initialization process explained in FIG. 3.

For example, it is assumed that the PON interface board 203$_1$, shown in FIG. 2, receives a data packet, at the PON communication section 233, in the up direction that is transferred from the subscriber terminal to the network (Y at step S321). In this case, the path class parameter stored in the path management table 235 of the PON interface board 203$_1$ is referred to (step S322). It is confirmed if the path class parameter is set to "concentrate" (Y at step S323). Thus, the L2 switch section 234 of the PON interface board 203$_1$ establishes the path to transmit the data packet from the PON communication section 233 to the multiplex control board communication section 231 of the PON interface board 203$_1$ in this example (step S324). Thereby, the multiplex control board 202 receives the data packet in the first PON interface communication section 226$_1$, and the L2 switch section 223 establishes the path to transmit the data packet from the first PON interface communication section 226$_1$ to the network communication section 225 by referring to the path management table 227, in which the path class corresponding to the PON interface board with the card number "1" is also set to "concentrate". Then, the network communication section 225 transmits the data packet through the "concentrate" SNI port 211 to the network (step S325).

On the other hand, when the PON interface board 203$_5$ (not shown) receives the data packet at its PON communication section 233, the path class parameter of the path management table 235 is set to "non-concentrate" (N at step S323). In this case, the L2 switch section 234 of the PON interface board 203$_5$ establishes the path to transfer the data from the PON communication section 233 to the network communication section 232 of own PON interface board 203$_5$. In this case, the network communication section 232 of the PON interface board 203$_5$ transmits the data packet to the network without intervention of the multiplex control board 202 (step S326).

As described above, the data transmitted from the subscriber terminals connected to the ONUs 207$_{11}$ to 207$_{1N}$ and 207$_{21}$ to 207$_{2N}$ accommodated within the PON interface boards 203$_1$ and 203$_2$ which are to be used for "line concentrate" is transferred from the subscriber terminals to the network through the paths as indicated by the arrow 251$_1$ and 251$_2$ to 251, as shown in FIG. 1. That is, the data is transferred from the subscriber terminals to the network via the ONUs 207$_{11}$ to 207$_{1N}$ and 207$_{21}$ to 207$_{2N}$, the PON section corresponding to the PON interface boards 203$_1$ and 203$_2$, the PON interface boards 203$_1$ and 203$_2$, the multiplex control board 202, the SNI port 211 of the multiplex control board 202 and the L2 switch 212.

On the other hand, the data transmitted from the subscriber terminals connected to the ONUs 207$_{(n-1)1}$ to 207$_{(n-1)N}$ and 207$_{n1}$ to 207$_{nN}$ accommodated within the PON interface boards 203$_{n-1}$ and 203$_n$ which are to be used for "non-concentrate" is transferred from the subscriber terminals to the network through the paths as indicated by the arrow 251$_n$ to $251_{(n-1)}$ as shown in FIG. 1. That is, the data is transmitted from the subscriber terminals to the network via the ONUs $207_{(n-1)1}$ to $207_{(n-1)N}$ and $207_{n1}$ to $207_{nN}$, the PON section corresponding to the PON interface boards $203_{n-1}$ and $203_n$, the PON interface boards $203_{n-1}$ and $203_n$, the SNI port $211_{n-1}$ and $211_n$ of the PON interface boards, and the L2 switch 212.

In this manner, the data transmission path in the up direction is set based on the contents (path control information) set in the path management table 235 of the PON interface board 203 and the path management table 227 of the multiplex control board 202.

In the first embodiment as described above, the data packet from the subscriber terminal to the network is processed for each PON interface board as a unit mounted on the OLT. Accordingly, to accommodate the ordinary subscribers and the business use (corporate or company) subscribers in the units of the PON interface boards clearly separately, for example, the PON interface boards for accommodating the ordinary subscribers may be set as "concentrate" and the PON interface boards for accommodating the business use subscribers "non-concentrate". That is, in the first embodiment, the path management table for each PON interface board is provided, and the path is changed or switched inside the OLT by referring to the path management table, whereby the path can be flexibly set without depending on the physical topology between the subscriber terminal and the network, and the data communication quality most adaptable to each subscriber terminal can be easily provided. In this manner, since the data traffic can be physically separated in the first embodiment, the network path design of the network and the optical access network can be simplified. Therefore, it is easier to make the maintenance and operation management of the network elements or system, and the optical access network with higher security can be provided. Further, in the first embodiment, the SNI ports of both the concentrate and non-concentrate types are prepared and the number of SNI ports is reduced, whereby the cost of facility investment for the optical access network is reduced.

Exemplary Embodiment 2

Figure 6:
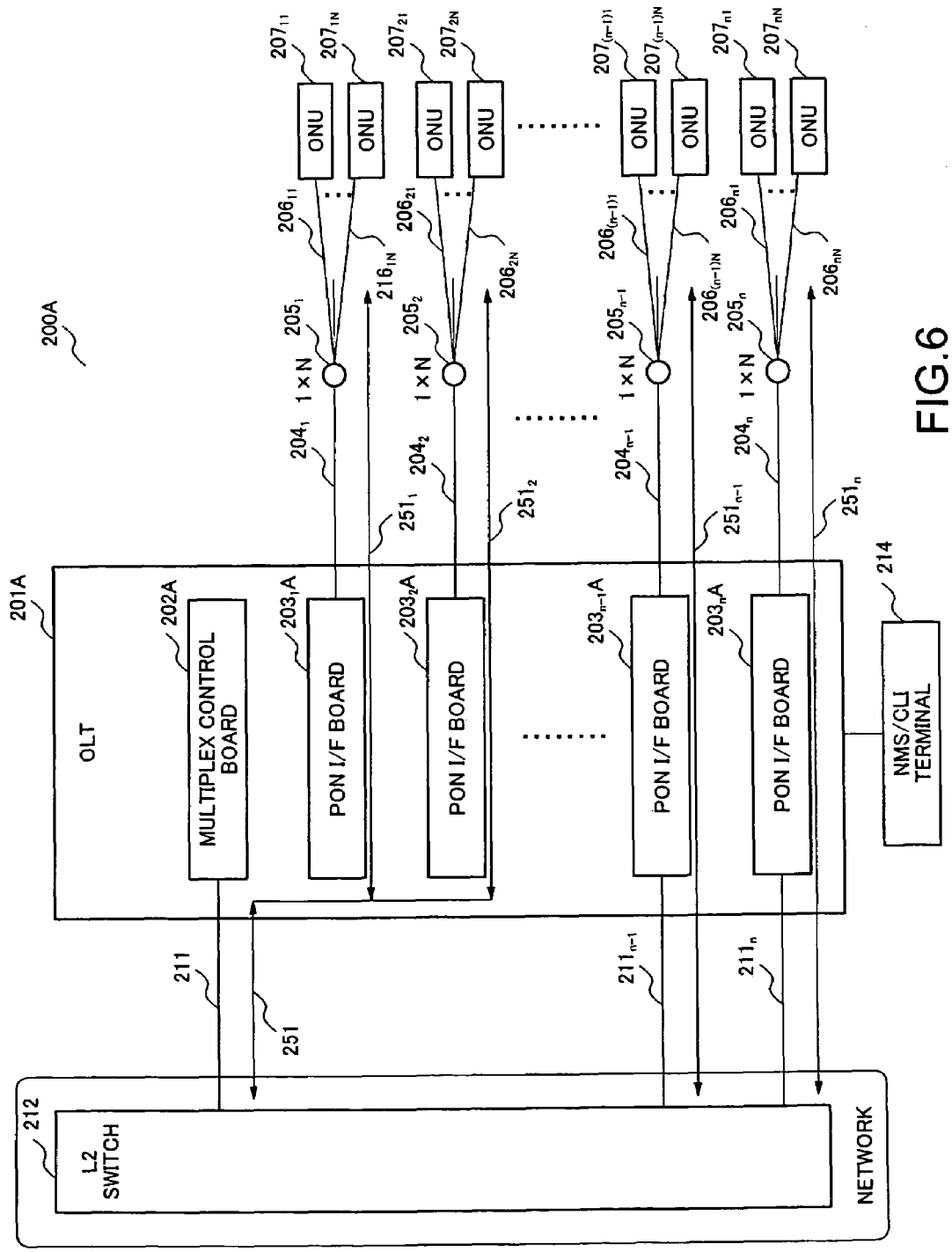
FIG. 6 is a system block diagram representing the essence of an optical access network according to a second embodiment of the present invention.

FIG. 6 is a system block diagram representing the essence of an optical access network according to a second embodiment of the present invention. In the optical access network 200A according to the second embodiment as shown in FIG. 6, the same parts are designated by the same reference numerals or signs as those of the optical access network 200 according to the first embodiment shown in FIG. 1, and the explanation of the same parts is omitted properly. In the optical access network 200A according to the second embodiment, contents of the path management tables of a multiplex control board 202A and each PON interface board 203A in an OLT 201A are slightly different from the path management tables of the multiplex control board 202 and each PON interface board 203 according to the first embodiment. Other points are the same as in the first embodiment.

Figure 7:
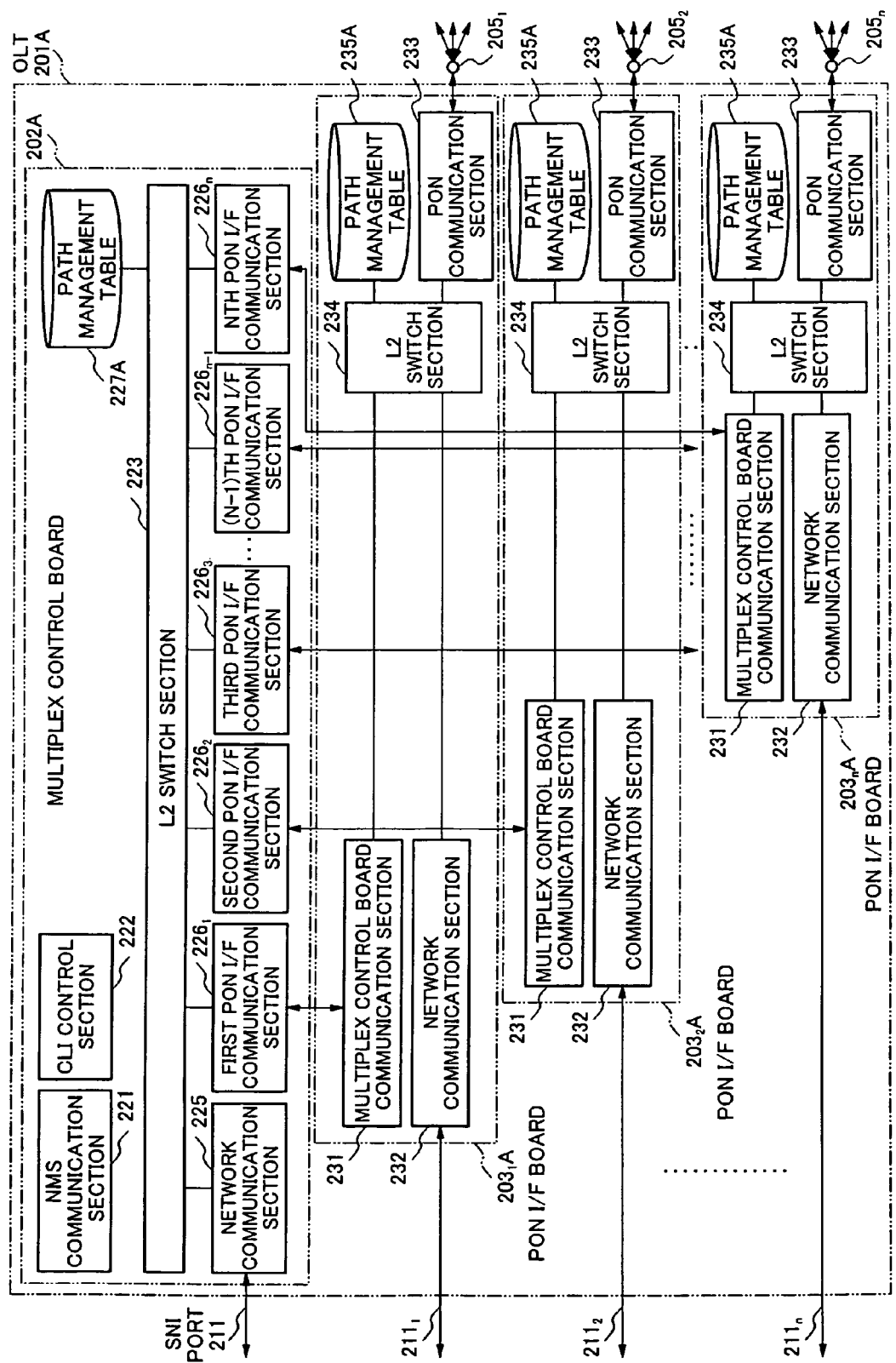
FIG. 7 is a block diagram representing the specific configuration of the OLT according to the second embodiment.

FIG. 7 is a block diagram representing the specific configuration of the OLT according to the second embodiment. The same parts are designated by the same reference numerals or signs throughout FIGS. 2 and 7, and the explanation of the same parts is omitted properly. The second embodiment is different from the first embodiment in that in the OLT 201A, each of a path management table 227A of the multiplex control board 202A and a path management table 235A of each PON interface board 203A has additional parameters of "a path selection policy and a path selection ID". In the second embodiment, the path management table is called as "a path management table with a path selection policy".

FIG. 8 is an explanatory view showing the path management table with a path selection policy according to the second embodiment. In the first embodiment, the path class of "concentrate" or "non-concentrate" is set for each of the PON interface boards $203_1$, $203_2$, ... and $203_n$. However, in the second embodiment, the path class of "concentrate" or "non-concentrate" is set depending on the combination of information of the card type, the path selection policy such as the ONU, the VLAN, the logical link identifier (LLID: Logical Link Identifier) and the protocol, and the path selection ID as shown in FIG. 8.

In the second embodiment, the initialization of the OLT 201A is performed by the NMS/CLI 214 in accordance with the same process explained in the first embodiment as shown in FIG. 3.

In the second embodiment of the present invention, when the NMS/CLI terminal 214 (shown in FIG. 6) performs the initialization of the OLT 201A by sending the intra-apparatus path control information (step S302 in FIG. 3), the path management table with path selection policy 241A as shown in FIG. 8 is constructed in the path management table 227A of the multiplex control board 202A. Also, extracted contents for each PON interface board 203A is set in the path management table 235A of each PON interface board 203A.

The data communication path from the network to the subscriber terminal and the data communication path from the subscriber terminal to the network in this state are the same as those of the first embodiment of the present invention. However, the PON interface board 203A performs the path selection for the data communication path from the subscriber terminal to the network in accordance with a path selection policy 401 for each of the PON interface boards 203A. And the information to be used as this path selection policy 401 is obtained by referring to the information contained in the data signal received from the subscriber terminal in the PON communication section 233 that performs the communication in the PON section.

The path selection policy 401 is employed as the policy for designating what the path selection is performed based on.

As shown in FIG. 8, in the case of "Card", the concentrate or non-concentrate path selection is controlled for the card, namely, each of the PON interface boards $203_1A$, $203_2A$, ... and $203_nA$. Also, in the case of "VLAN", the concentrate or non-concentrate path selection is controlled on a VLAN basis. Particularly, when the VLAN is designated, the ID designated in the parameter of the path selection ID 402 is further referred to. When the path selection policy 401 is "VLAN" and the path selection ID 402 is "10", the path selection control of "concentrate" is performed for the data of "VLAN ID=10".

Also, when the path selection policy 401 is "ONU", the concentrate or non-concentrate path selection control is performed for each ONU connected to the PON interface board, and particularly, when the ONU is designated, the ID designated in the parameter of the path selection ID 402 is further referred to. When the path selection policy 401 is "ONU" and the path selection ID 402 is "1", the path selection control of "concentrate" is performed for the data of "ONU ID=1".

Also, when the path selection policy 401 is "Protocol", the concentrate or non-concentrate path selection control is performed for each type of protocol handled by the PON interface board, and the type of protocol designated in the parameter of the path selection ID 402 is further referred to. For example, when the path selection policy 401 is "Protocol" and the path selection ID 402 is "PPP" (Point-to-Point Protocol), the data signal handled by the PON interface board is referred to and when data is related with "PPP", the path selection control of "non-concentrate" is performed.

Thus, in the second embodiment, the process for selecting the path for transmitting the data signal to the network is performed inside each PON interface board 203A based on the information (VLAN class, type of protocol, ID of the ONU, logical link identifier, etc.) contained in the data packet received from the subscriber terminal. That is, in the second embodiment, the path management table with path selection policy is provided, and the path is changed or switched inside the OLT by referring to this path management table with path selection policy, whereby the path can be flexibly set without depending on the physical topology between the subscriber terminal and the network. Therefore, the same effects can be achieved as in the first embodiment, and further the path setting by the logical detail level and the design of network path can be performed, whereby the flexible system can be constructed.

Exemplary Embodiment 3

Figure 9:
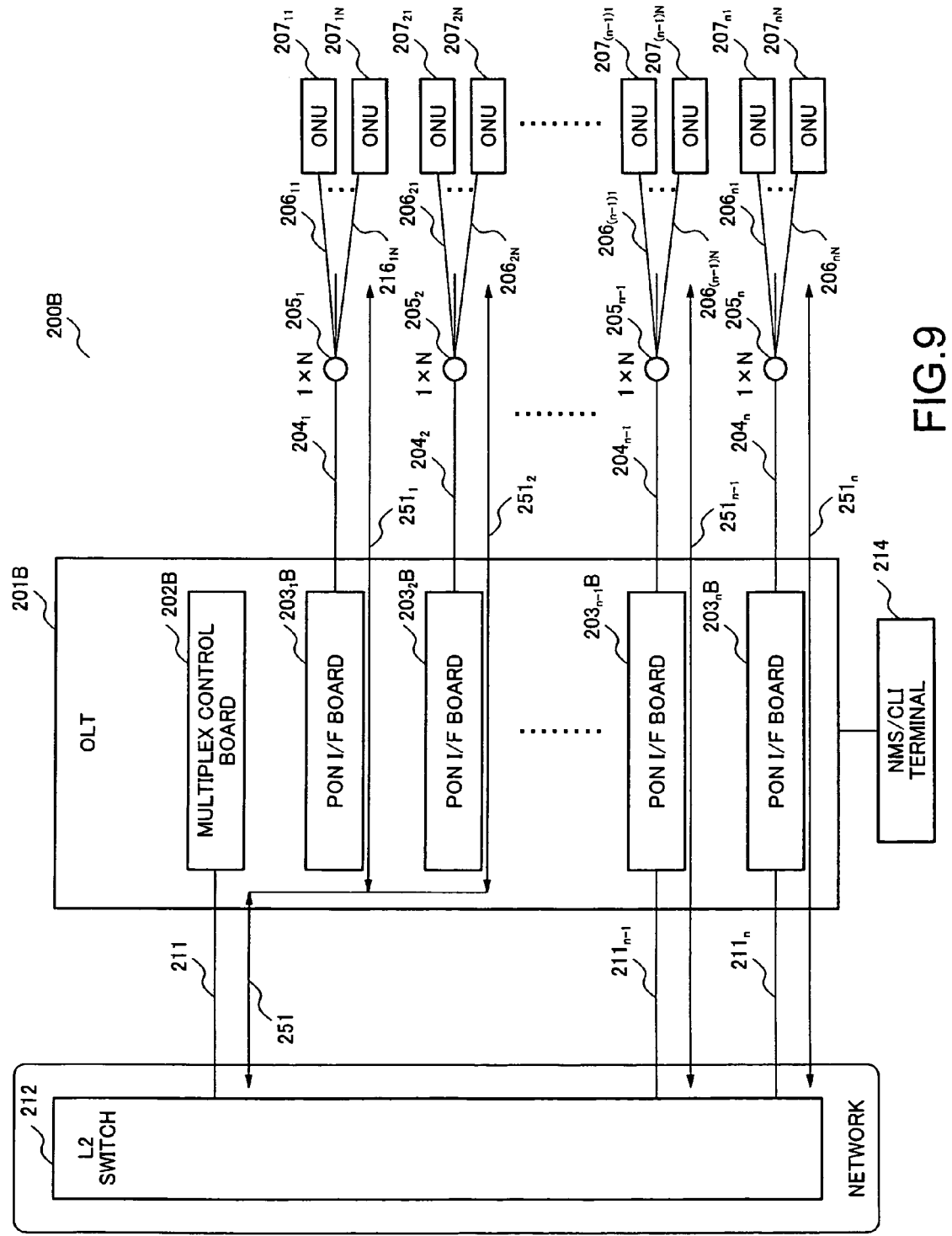
FIG. 9 is a system block diagram representing the essence of an optical access network according to a third embodiment of the present invention.

FIG. 9 is a system block diagram representing the essence of an optical access network according to a third embodiment of the present invention. In the optical access network 200B according to the third embodiment as shown in FIG. 9, the same parts are designated by the same reference numerals or signs as those of the optical access network 200 according to the first embodiment as shown in FIG. 1, and the explanation of the same parts is omitted properly. The optical access network 200B according to the third embodiment is different from the optical access network 200 according to the first embodiment in that a multiplex control board 202B in an OLT 201B has a DHCP (Dynamic Host Configuration Protocol) server function, an IGMP (Internet Group Management Protocol) snooping function and an MLD (Multicast Listener Discovery) snooping function, and a path management table with a multiplex control board function valid policy is contained in each of the path management tables of the multiplex control board 202B and a plurality of PON interface boards $203_1B$, $203_2B$, . . . and $203_nB$. In the third embodiment, the path management table is called as "a path management table with a multiplex control board function valid policy".

A different point of the path management table with multiplex control board function valid policy according to the third embodiment from the path management table with path selection policy 241A according to the second embodiment as shown in FIG. 8 is that the parameter of "the multiplex control board function valid policy" is used as the policy information indicating whether or not the function provided by the multiplex control board is valid to use. For example, in a case where the multiplex control board 202B of the third embodiment provides a DHCP (Dynamic Host Configuration Protocol) server function, as will be described later, when the multiplex control board function valid policy parameter is "ON", the subscriber terminal connecting to the PON interface board $203_xB$ corresponding to this policy parameter can use the DHCP server function of the multiplex control board, or when the multiplex control board function valid policy parameter is "OFF", the subscriber terminal cannot use the DHCP server function of the multiplex control board.

For example, this means that when the network is constructed by the DHCP but the multiplex control board function valid policy corresponding to the certain PON interface board $203_xB$ is set to "OFF", it is required that the DHCP server other than that provided by the multiplex control board is prepared somewhere in the network for the subscriber terminal connecting to the PON interface board $203_xB$.

Figure 10:
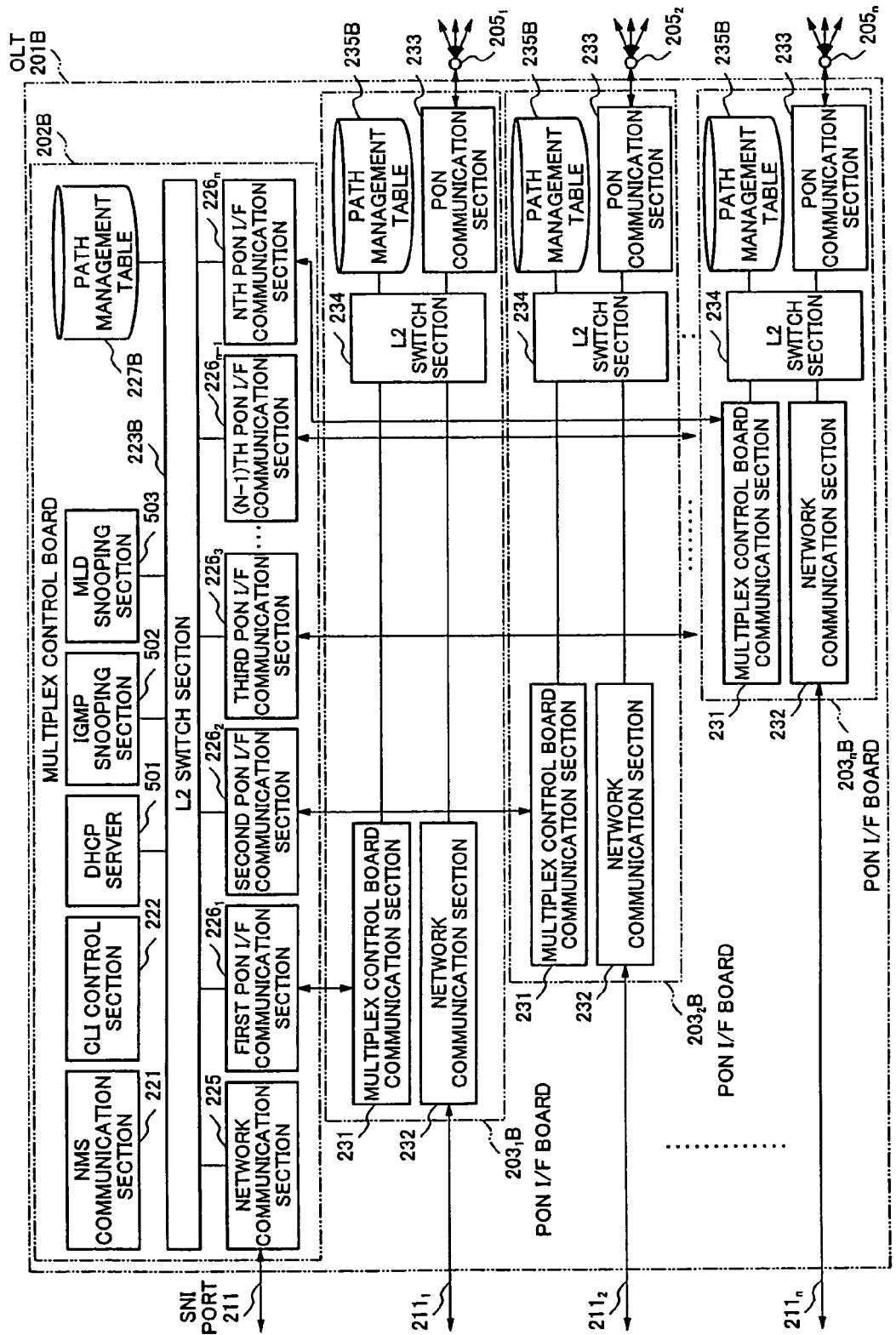
FIG. 10 is a block diagram representing the specific configuration of the OLT according to the third embodiment.

FIG. 10 is a block diagram representing the specific configuration of the OLT according to the third embodiment. The same parts are designated by the same reference numerals or signs throughout FIGS. 2 and 10, and the explanation of the same parts is omitted properly. In the OLT 201B, a DHCP server 501, an IGMP snooping section 502 and an MLD snooping section 503 are newly connected to an L2 switch section 223B of the multiplex control board 202B. Also, a path management table 227B has a path management table with a multiplex control board function valid policy.

FIG. 11 is an explanatory view showing the contents of the path management table with multiplex control board function valid policy 511. The path management table with multiplex control board function valid policy 511 is the same as the PON interface board path management table 241 in the first embodiment as shown in FIG. 4, except that the data indicating that the multiplex control board function valid policy 512 is "ON" or "OFF" is additionally provided.

The DHCP server 501, the IGMP snooping section 502 and the MLD snooping section 503 as shown in FIG. 10 are apparatus examples provided in the multiplex control board 202B, but not limited to these examples. For example, an apparatus becoming a server such as a PPP server, an RAS (Remote Access Server) or an RADIUS (Remote Authentication Dial-in User Service) server, which is generally employed for the subscriber authentication, may be connected to the L2 switch section 223B.

In the optical access network according to the third embodiment, the multiplex control board 202B has the server function and the snooping function. Accordingly, the process between the server and the client, which is performed via the network so far, can be performed inside the OLT 201B in the optical access network. Also, it is new feature of the third embodiment that a path selection control of "concentrate or non-concentrate" in conjunction with utilizing these functions is provided.

Figure 12:
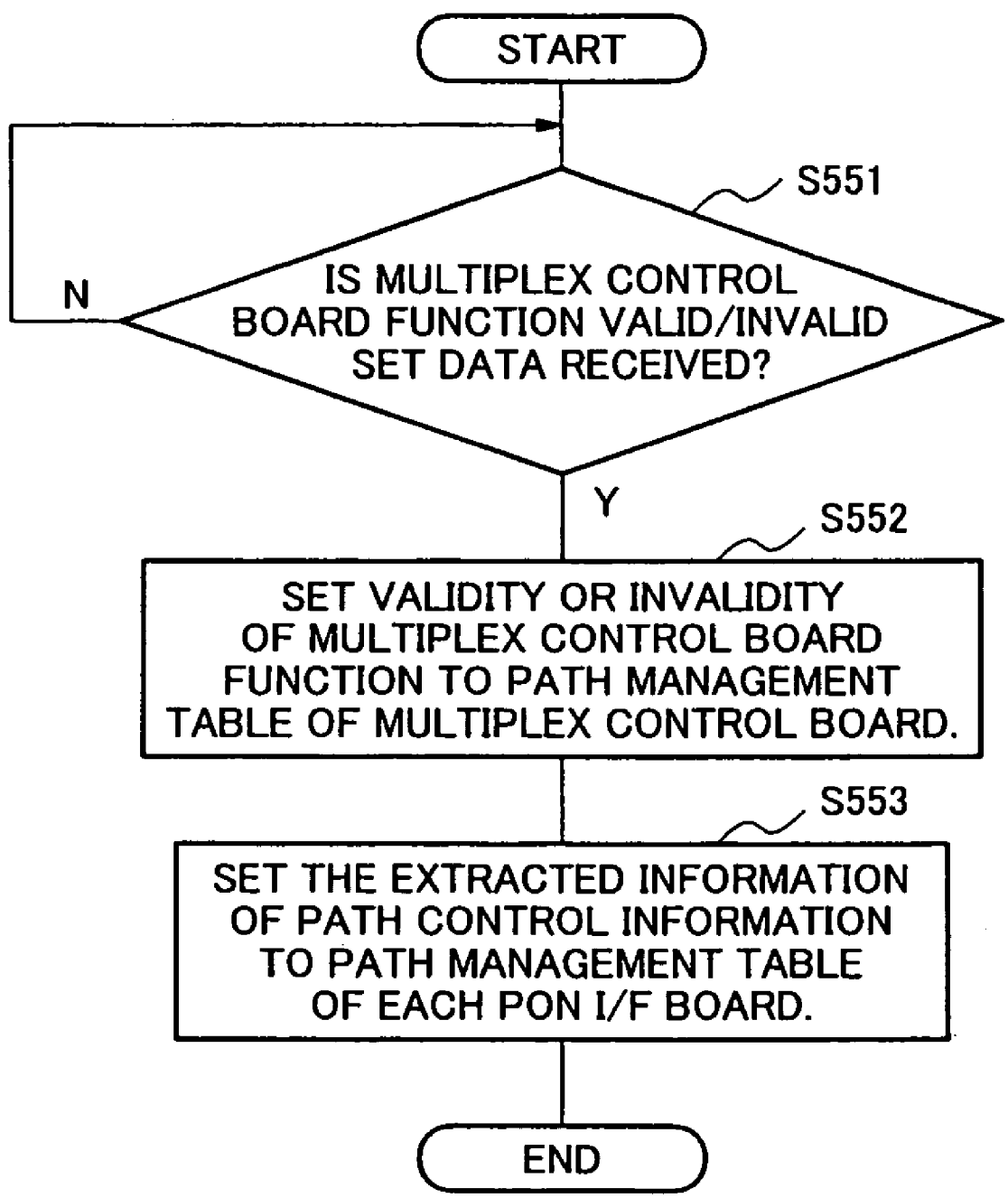
FIG. 12 is a flowchart showing an initialization process of the OLT by the NMS/CLI according to the third embodiment.

FIG. 12 is a flowchart for explaining an initialization process of the OLT by the NMS/CLI terminal according to the third embodiment. The OLT 201B as shown in FIG. 9 waits to receive the path control information for setting the validity or invalidity of the multiplex control board function from the NMS/CLI terminal 214 (step S551). If the path control information for setting data is received (Y), the validity or invalidity of the multiplex control board function is set in the path management table 227B of the multiplex control board 202B (FIG. 10) (step S552). Thereafter, the path control information corresponding to each PON interface board 203B is extracted, and is set in the path management table 235B of each PON interface board (shown in FIG. 10) (step S553). The initialization process for other items (card number, card type, path class) in the path management table with multiplex control board function valid policy 511 are already described in the initialization process for the PON interface board path management table 241 according to the first embodiment, as shown in FIG. 3, and its illustration is omitted here.

The operation of the optical access network 200B according to the third embodiment will be described below.

In the third embodiment, the path management table with multiplex control board function valid policy 511 as shown in FIG. 11 is constructed in the path management table 227B. Also, the extracted path control information corresponding to each PON interface board is set in the path management table 235B of each PON interface board.

The data communication path from the network to the subscriber terminal in the third embodiment is the same as that of the first embodiment of the present invention, and its explanation is omitted.

Figure 13:
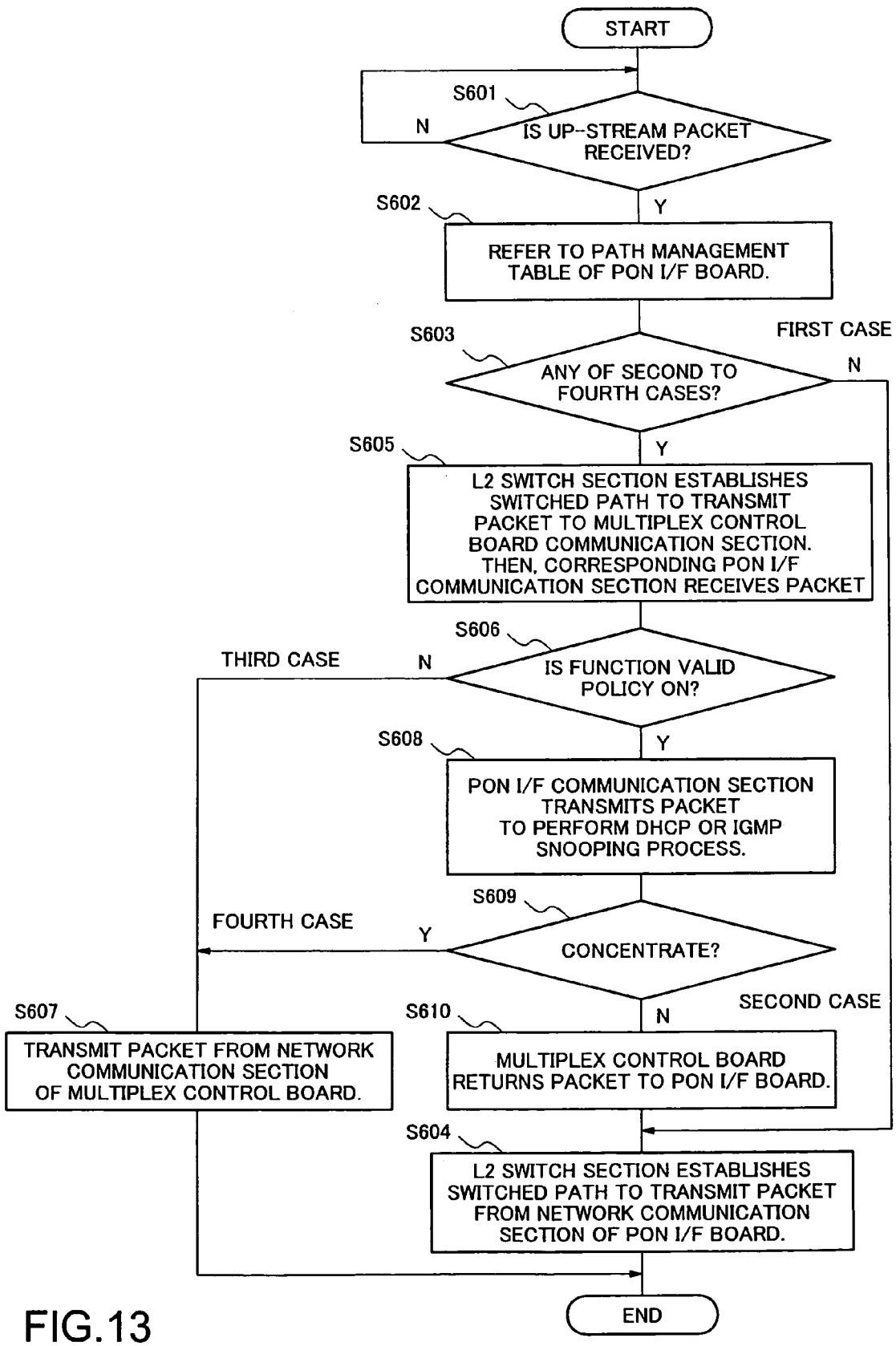
FIG. 13 is a flowchart showing a process of data communication path selection for the up-stream data to the network according to the third embodiment.

FIG. 13 is a flowchart representing a process of setting data communication path from the subscriber terminal to the network in the third embodiment.

The PON interface boards $203_1B$, $203_2B$, ... and $203_nB$ monitor r the reception of a data packet, at the PON communication section 233, in the up direction transferred from the subscriber terminal to the network (step S601). If the data packet is received (Y at step S601), the path management table 235B, which has the contents extracted from the path management table with multiplex control board function valid policy 511, is referred to (step S602). And it is discriminated which of the following four cases occurs (step S603).

First case: the path class 244 is "non-concentrate" and the multiplex control board function valid policy 512 is "OFF".

Second case: the path class 244 is "non-concentrate" and the multiplex control board function valid policy 512 is "ON".

Third case: the path class 244 is "concentrate" and the multiplex control board function valid policy 512 is "OFF".

Fourth case: the path class 244 is "concentrate" and the multiplex control board function valid policy 512 is "ON".

Herein, in the first case, the line is not concentrate, and the additional functions such as the server function and the snooping function by the multiplex control board 202B are not applied. In the second case, the line is not concentrate, but the additional functions such as the server function and the snooping function by the multiplex control board 202B are applied. In the third case, the line is concentrate, and the additional functions such as the server function and the snooping function by the multiplex control board 202B are not applied. In the fourth case, the line is concentrate, and the additional functions such as the server function and the snooping function by the multiplex control board 202B are applied.

For example, in the case of the PON interface board $203_5B$ (corresponding to the card number 5 of FIG. 11), if the path management table 235B is referred to at step S602, the path class 244 is "non-concentrate" and the multiplex control board function valid policy 512 is "OFF", whereby the first case is determined at step S603. In this case (N at step S603), the L2 switch section 234 of the PON interface board $203_5B$ establishes the switched path between the PON communication section 233 and the network communication section 232 to transfer the received packet to the network communication section 232 of the own PON interface board $203_5B$, which then transmits the packet via the SNI port $211_5$, not shown, to the network (step S604).

Figure 14:
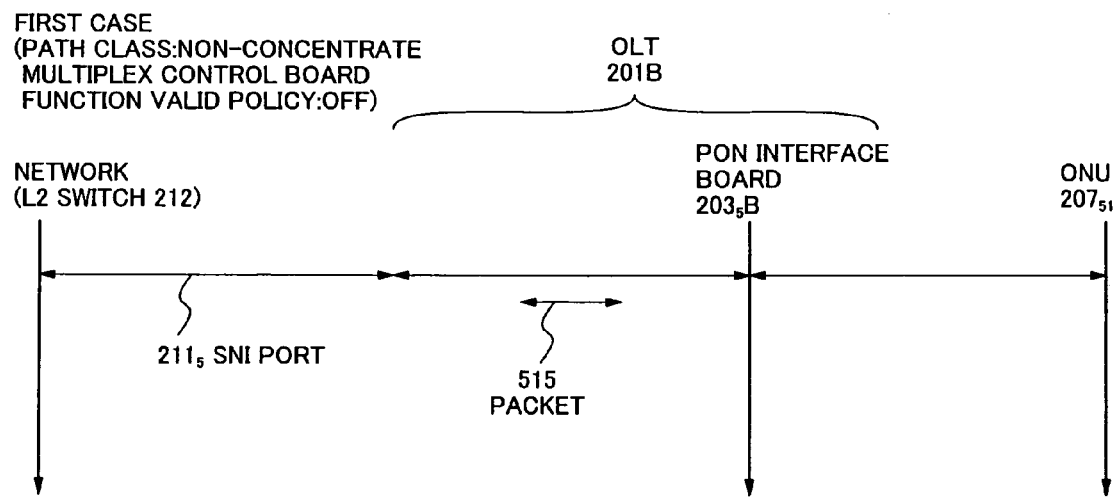
FIG. 14 is an explanatory view showing the flow of control signal and data in a first case according to the third embodiment.

FIG. 14 is an explanatory view illustrating the first case. Herein, as one example, the communication between the ONU $207_{51}$ and the network is illustrated. In the first case, the packet transmitted from the L2 switch 212 of the network arrives via the SNI port $211_5$ at the OLT 201B, and distributed to the ONU of destination. In this way, the packet 515 composed of the IGMP control signal or data is received by the ONU $207_{51}$. On the other hand, the packet transmitted from the ONU $207_{51}$ arrives at the OLT 201B, and is received by the corresponding PON interface board $203_5B$. The received packet is sent directly from the network communication section 232 of the PON interface board $203_5B$ via the SNI port $211_5$ to the L2 switch 212 of the network. In this way, the packet is not via the multiplex control board 202B (FIG. 9) in the first case.

On the other hand, if it is discriminated at step S603 that any of the second to fourth cases occurs (Y at step S603) as a result of referring to the path management table 235B at step S602 of FIG. 13, the L2 switch section 234 of the PON interface board $203_xB$ establishes the switched path between the multiplex control board communication section 231 and the PON communication section 233 to transfer the received packet to the multiplex control board communication section 231. And the multiplex control board communication section 231 sends this packet to the corresponding X-th PON interface communication section $226_x$ of the multiplex control board 202B (step S605). If the X-th PON interface communication section $226_x$ receives this packet, it is discriminated whether or not the multiplex control board function valid policy 512 in which the card number 242 corresponds to "X" is "ON" by referring to the path management table 227B (step S606). (Here, the switched path between the X-th PON interface communication section-$226_x$ and the path management table 227B is established by the L2 switch section 223B.) If the multiplex control board function valid policy 512 is not "ON" but "OFF" (N at step S606), its packet is transmitted from the network communication section 225 of the OLT 201B to the network (step S607). (Here, the switched path between the X-th PON interface communication section $226_x$ and the network communication section 225 is established by the L2 switch section 223B.) That is, this is the third case corresponding to the PON interface board $203_3B$ in which the card number "X" is "3" as seen from FIG. 11.

On the contrary, if it is discriminated at step S606 that the multiplex control board function valid policy 512 is "ON" (Y at step S606), the packet received at the X-th PON interface communication section $226_x$ is transmitted via the L2 switch section 223B to the DHCP server 501, the IGMP snooping section 502 or the MLD snooping section 503, where the DHCP function by the DHCP server 501 or the IDMP snooping function by the IGMP snooping section 502 is performed (step S608). That is, in the second and fourth cases, since the multiplex control board function valid policy 512 in the path management table with multiplex control board function valid policy 511 of FIG. 11 is "ON", the additional functions such as the server function and the snooping function by the multiplex control board 202B are applied.

Thereafter, the path management table with multiplex control board function valid policy 511 is confirmed again depending on which of the PON interface boards $203_1B$, $203_2B$, ... and $203_nB$ receives this packet. As a result, if the path class 244 is "concentrate" (Y at step S609), the packet corresponds to the fourth case, the switched path between the X-th PON interface communication section $226_x$ and the network communication section 225 is established by the L2 switch section 223B, and the packet is transmitted from the network communication section 225 of the multiplex control board 202B to the network (step S607). This is the fourth case corresponding to the PON interface board $203_mB$ in which the card number "X" is "m" as seen from FIG. 11.

On the other hand, if the path class 244 is "non-concentrate" (N at step S609), the multiplex control board 202B returns the packet from the X-th PON interface communication section 226X to the multiplex control board communication section 231 of the PON interface board $203_xB$ that has sent the packet (step S610). Then, the L2 switch section 234 of the PON interface board $203_xB$ establishes the switched path between the multiplex control board communication section 231 and the network communication section 232 of the PON interface board $203_xB$ to transmit the packet to the network communication section 232, and the packet is transmitted from there to the network (step S604). This is the second case corresponding to the PON interface board $203_nB$ in which the card number "X" is "n" as seen from FIG. 11.

Figure 15:
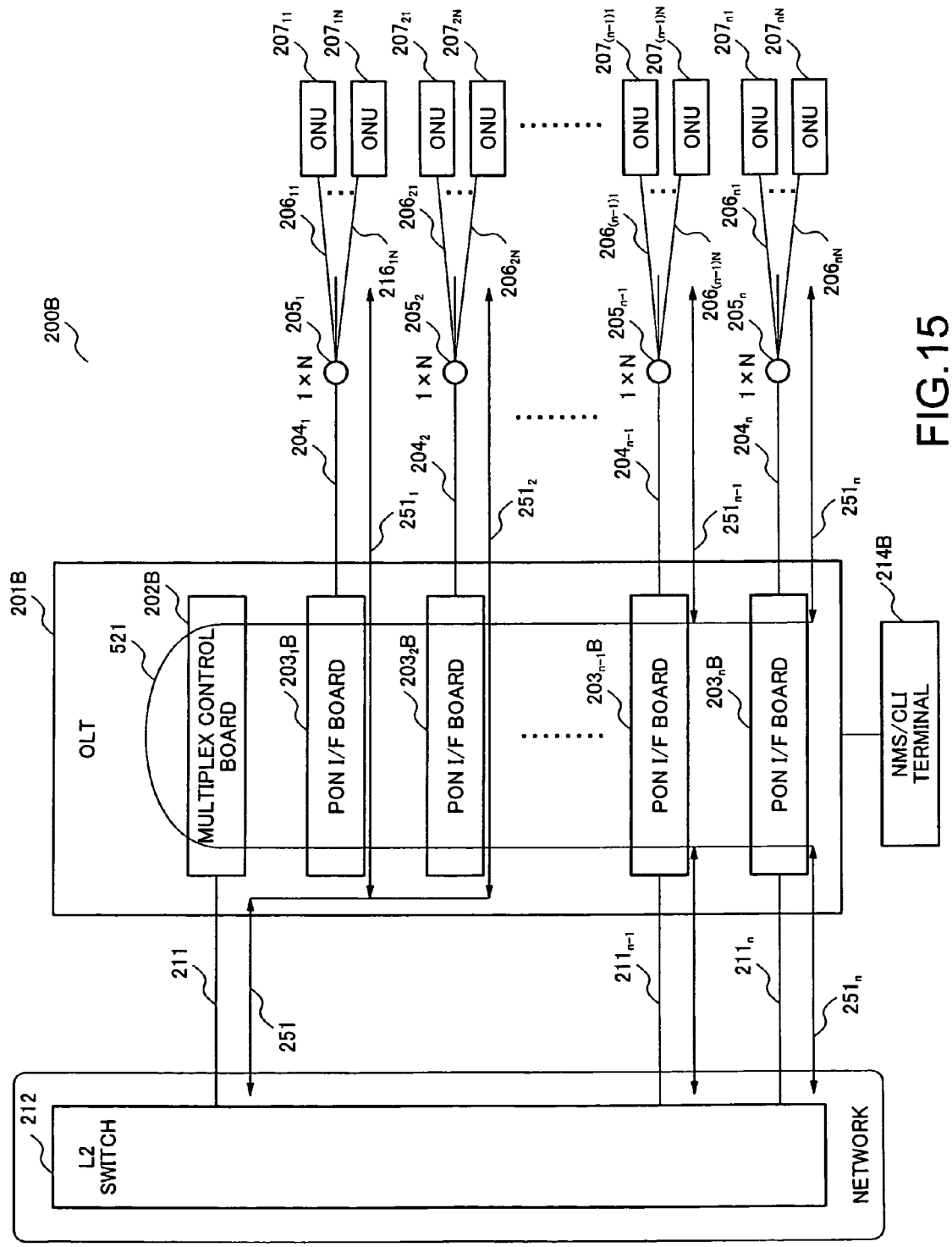
FIG. 15 is an explanatory view representing how the path selection is performed in accordance with the contents of the path management table according to the third embodiment.

FIG. 15 is an explanatory view representing how to select the path according to the contents of the path management table with multiplex control board valid policy in the optical access network according to the third embodiment. The multiplex control board function valid policy 512 of the path management table with multiplex control board valid policy 511 as shown in FIG. 11 is used as the policy indicating whether or not the function provided by the multiplex control board 202B as shown in FIG. 10 is validated. For example, in the case where the multiplex control board 202B provides the function as the DHCP (Dynamic Host Configuration Protocol) server 501, if the multiplex control board function valid policy 512 is "ON", namely, in the second and fourth cases, the subscriber terminal connecting to the PON interface board $203_xB$ can use the functions of the DHCP server 501 of the multiplex control board 202B. On the contrary, in the first and third cases in which the multiplex control board function valid policy 512 is "OFF", the subscriber terminal connecting to the PON interface board $203_xB$ cannot use the functions of the DHCP server 501 of the multiplex control board 202B. For example, this means that when the network is constructed by the DHCP but the multiplex control board function valid policy 512 for the certain PON interface board $203_xB$ is set to "OFF", it is required that the DHCP server other than the DHCP server 501 provided by the multiplex control board 202B is prepared somewhere in the network for the subscriber terminal connecting to the PON interface board $203_xB$.

In the fourth case in which the path class 244 is "concentrate" and the multiplex control board function valid policy 512 is set to "ON", the data signal of the subscriber terminal accommodated in the PON interface board $203_xB$ can use the server function of the multiplex control board 202B on the path as indicated by numeral 521, and the data is transmitted via the concentrate SNI port 211 of the multiplex control board 202B.

Figure 16:
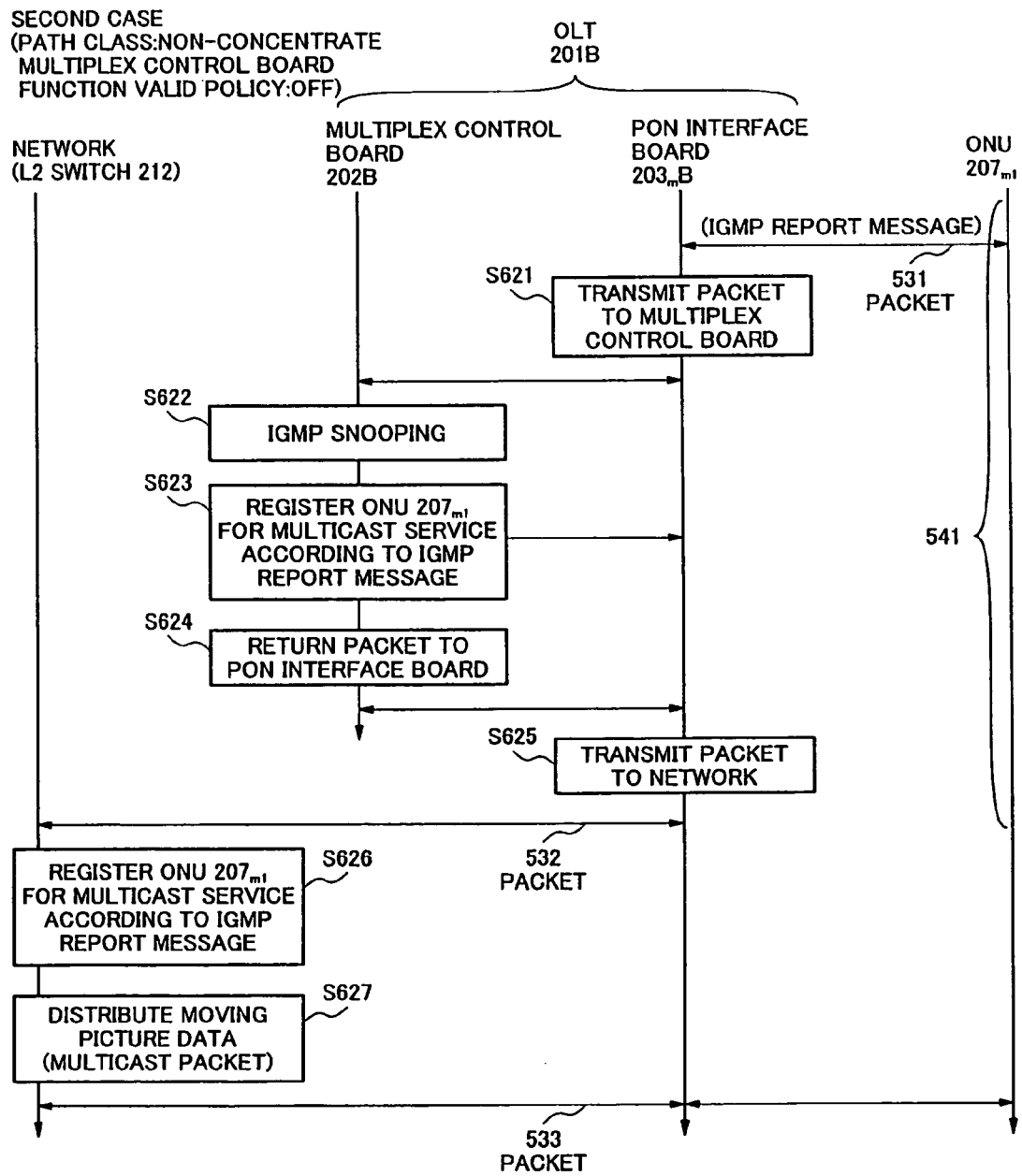
FIG. 16 is an explanatory view showing the flow of control signal and data in a second case according to the third embodiment.

FIG. 16 is an explanatory view illustrating the second case, corresponding to FIG. 14. In the second case, the additional functions of the multiplex control board 202B can be applied, because the multiplex control board function valid policy 512 is "ON". Herein, as one example, the communication between the ONU $207_{m1}$ and the network is illustrated. The ONU $207_{m1}$ performs the packet communication with the network via the corresponding PON interface board $203_xB$. Since the multiplex control board function valid policy 512 is "ON", the packet sent from the ONU $207_{m1}$ is received at the PON interface board $203_xB$ and transmitted to the multiplex control board 202B (step S621).

In the multiplex control board 202B, the IGMP snooping section 502 performs the IGMP snooping function to peep into the contents of packet which is an IGMP report message (step S622). And, it performs the registration of multicast service for the ONU $207_{m1}$ to the corresponding PON interface board $203_mB$ according to the contents of the IGMP report message (step S623). Then, the packet is returned to the original PON interface board $203_mB$ (step S624). This is because the path class 244 is "non-concentrate". Then, the packet is transmitted from the network communication section 232 of the PON interface board $203_mB$ via the SNI port $211_m$, not shown, to the L2 switch 212 of the network, and is transmitted from there to a desired destination of the network (step S625).

When this transmitted packet 532 is received on the network side, the ONU $207_{m1}$ is registered as the delivery destination of the multicast service in accordance with the contents of the IGMP report message (step S626). And the applicable moving picture data is distributed as the multicast packet to the destinations including the ONU $207_{m1}$ (step S627). At this time, the distributed multicast data 533 arrives from the network (L2 switch 212) via the SNI port $211_m$ of the PON interface board $203_mB$ of the OLT 201B, and then is transmitted to the ONU $207_{m1}$ having requested the multicast service. In FIG. 16, the signaling section indicated by numeral 541 represents the signaling section for IGMP control signals.

Figure 17:
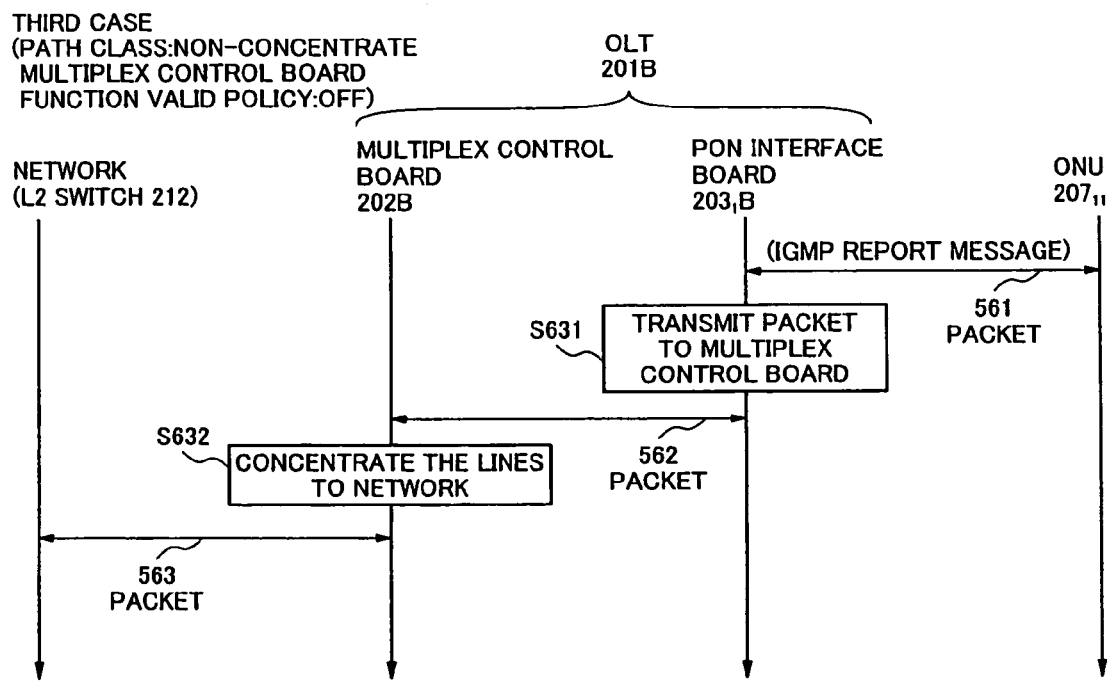
FIG. 17 is an explanatory view showing the flow of control signal and data in a third case according to the third embodiment.

FIG. 17 is an explanatory view illustrating the third case, corresponding to FIGS. 14 and 16. In the third case, the multiplex control board 202B is involved in the packet transfer, because the multiplex control board function valid policy 512 is "OFF" but the path class 244 is "concentrate". Herein, as one example, the packet communication between the ONU $207_{11}$ and the network is illustrated.

A packet 561 transmitted from the ONU $207_{11}$ to the network is received by the corresponding PON interface board $203_1B$, and sent to the multiplex control board 202B (step S631). The additional functions are not applied in the multiplex control board 202B. Accordingly, the multiplex control board 202B concentrates the received packet 562 with other packets, not shown, sent on other paths, and transmits the packet 563 from the network communication section 225 of the multiplex control board 202B via the SNI port 211 to the network (step S632).

On the other hand, the packet sent from the network is received by the network communication section 225 of the multiplex control board 202B, and distributed to the PON interface board 203B corresponding to the destination. Accordingly, the packet addressed to the ONU $207_{11}$ is distributed to the corresponding PON interface board $203_1B$ and transmitted to the ONU $207_{11}$.

Figure 18:
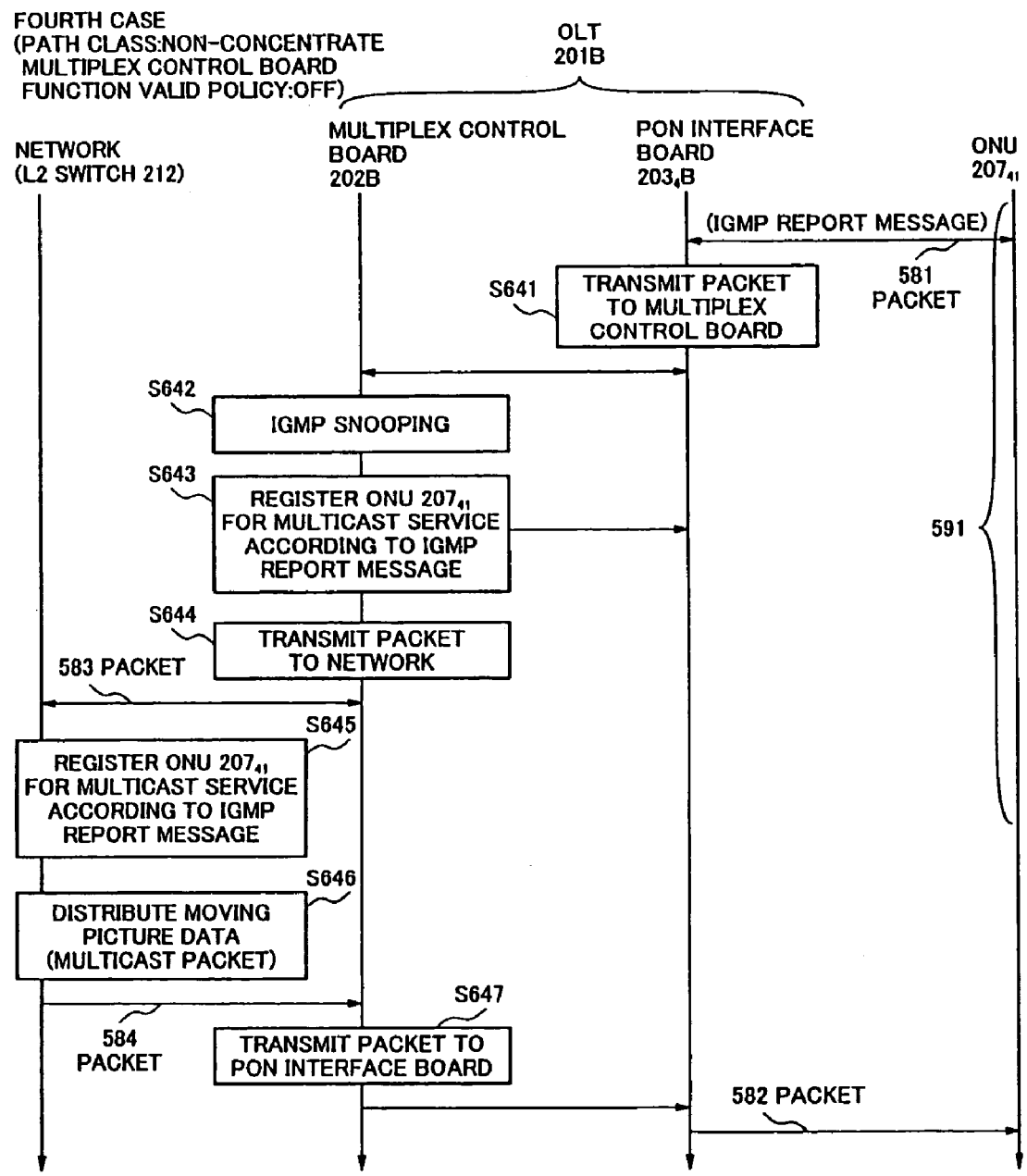
FIG. 18 is an explanatory view showing the flow of control signal and data in a fourth case according to the third embodiment.

FIG. 18 is an explanatory view illustrating the fourth case, corresponding to FIGS. 14, 16 and 17. In the fourth case, the multiplex control board 202B is involved at the highest degree, because the path class 244 is "concentrate" and the multiplex control board function valid policy 512 is "ON". Herein, as one example, the packet communication between the ONU $207_{41}$ and the network is illustrated. The ONU $207_{41}$ communicates the packet 581 which is an IGMP report message with the network via the corresponding PON interface board $203_4B$. Since the multiplex control board function valid policy 512 is "ON", the packet transmitted from the ONU $207_{41}$ is sent to the multiplex control board 202B (step S641).

In the multiplex control board 202B, the IGMP snooping section 502 as shown in FIG. 10 performs the IGMP snooping to peep into the contents of packet (step S642). And, it performs the registration of multicast service for the ONU $207_{41}$ to the corresponding PON interface board $203_4B$ according to the contents of an IGMP report message (step S643). Thereafter, the packet is not returned to the original PON interface board $203_4B$ because the path class is "concentrate", but directly transmitted from the network communication section 225 of the multiplex control board 202B via the SNI port 211 to the network (step S644). Thereby, the packet 583 is transmitted via the L2 switch 212 of the network to a desired destination of the network.

When this transmitted packet 583 is received on the network side, the ONU $207_{41}$ is registered as the delivery destination of the multicast service in accordance with the contents of the IGMP report message (step S645). And the applicable moving picture data is distributed as the multicast packet to the destinations including the ONU $207_{41}$ (step S646). At this time, the distributed multicast data 584 arrives from the network (L2 switch 212) via the SNI port 211 at the multiplex control board 202B, and then is transmitted to the PON interface board $203_4B$ of the OLT 201B (step S647). The PON interface board $203_4B$ transmits a packet 586 to the ONU $207_{41}$ having requested the multicast service. In FIG. 18, the signaling section indicated by numeral 591 represents the signaling section of IGMP control signals.

As described above, in the third embodiment of the present invention, the multiplex control board comprises the server function, control information of "concentrate or non-concentrate" is set for each PON interface board, and also control information whether or not the server function of the multiplex control board is used is set. Therefore, the flexible path selection is allowed, and the function of authenticating the subscriber terminal accommodated in the OLT can be configured in a closed form in the optical access network owing to the server function provided by the OLT, as in the first and second embodiments, whereby the security within the optical access network and the operability of the access network are improved.

In the third embodiment, the parameters of the path class 244 and the multiplex control function valid policy 512 are combined in the path management table with multiplex control board function valid policy 511, but the present invention is not limited to this combination. For example, the combinations between the VLAN and the multiplex control board function valid policy 512, the OLT management number and the multiplex control board function valid policy 512, and the logical link identifier and the multiplex control board function valid policy 512 are also effective.

Exemplary Embodiment 4

Figure 19:
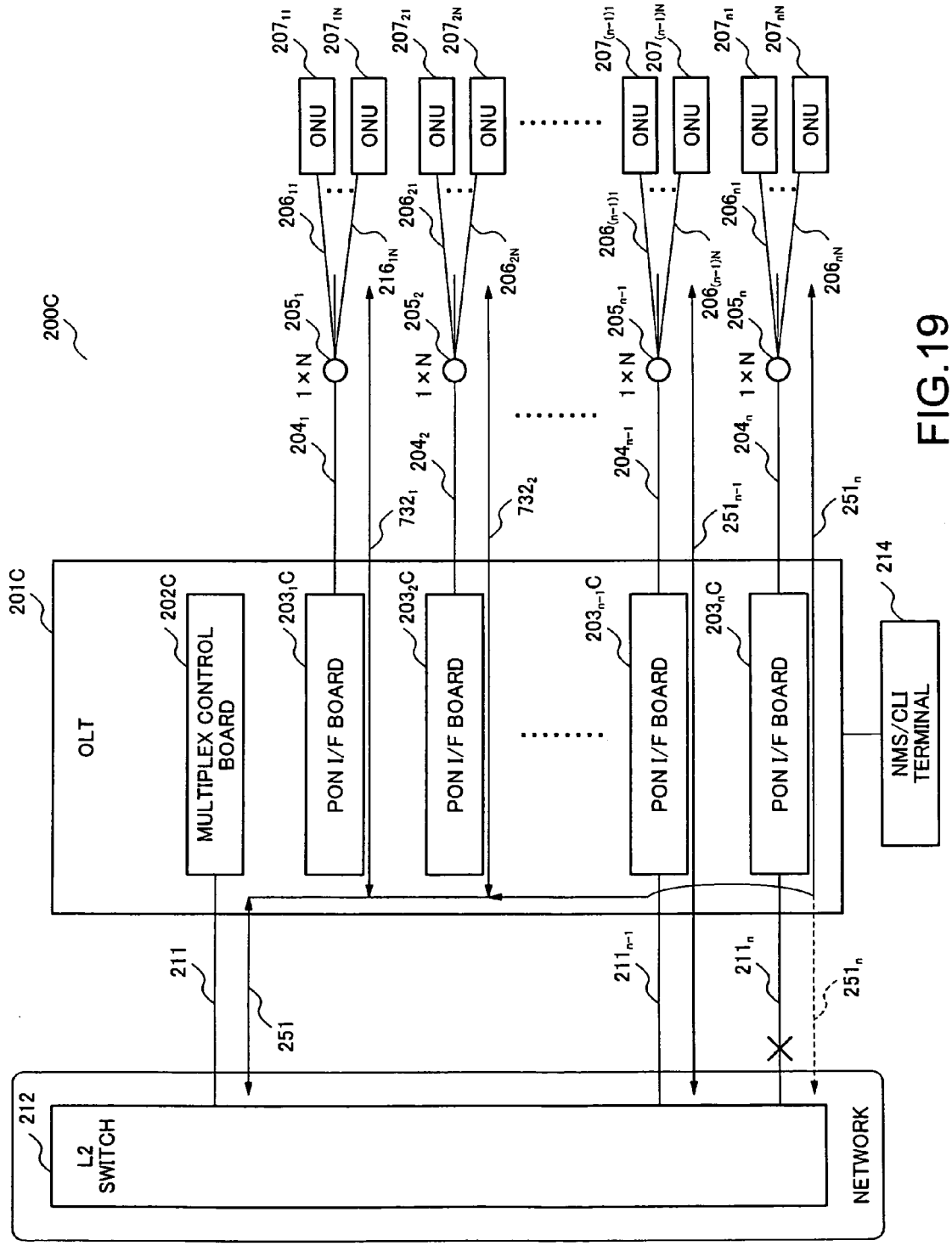
FIG. 19 is a system block diagram representing the essence of an optical access network according to a fourth embodiment of the present invention.

FIG. 19 is a system block diagram representing the essence of an optical access network according to a fourth embodiment of the present invention. In the optical access network 200C according to the fourth embodiment as shown in FIG. 19, the same parts are designated by the same reference numerals or signs as in the optical access network 200 according to the first embodiment as shown in FIG. 1, and the explanation of the same parts is omitted properly. In the optical access network 200C according to the fourth embodiment, a multiplex control board 202C in an OLT 201C and n PON interface boards $203_1C$, $203_2C$, ... and $203_nC$ are slightly different from n PON interface boards $203_1$, $203_2$, ... and $203_n$ according to the first embodiment as shown in FIG. 1. Other points are the same as in the first embodiment.

Figure 20:
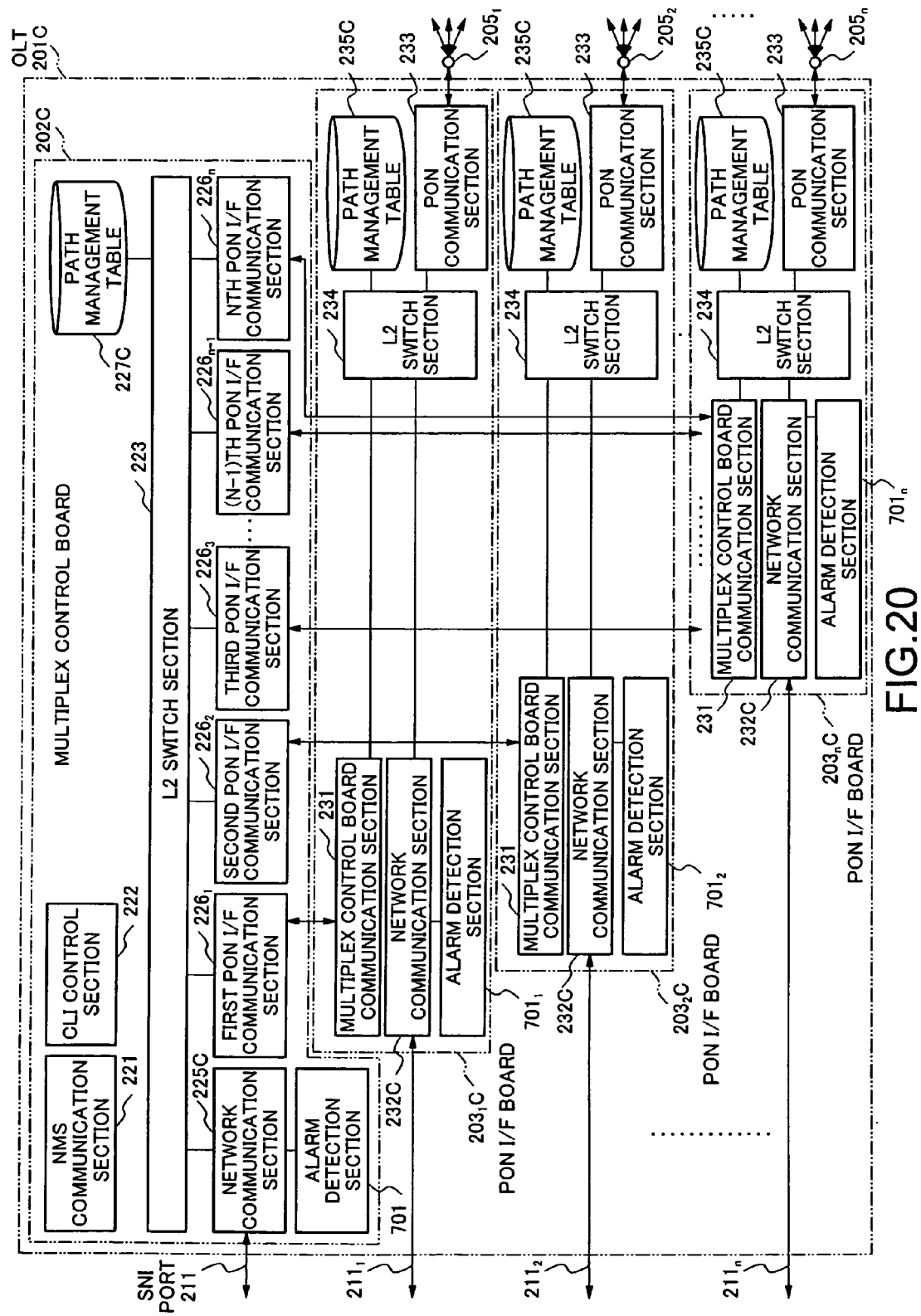
FIG. 20 is a block diagram representing the specific configuration of the OLT according to the fourth embodiment.

FIG. 20 is a block diagram representing the specific configuration of the OLT 201C according to the fourth embodiment. The multiplex control board 202C of the OLT 201C comprises an alarm detection section 701 for detecting the line disturbance at the SNI port 211. The PON interface boards $203_1C$, $203_2C$, ... and $203_nC$ comprise the alarm detection sections $701_1$, $701_2$, ... and $701_n$ for detecting the corresponding line disturbance at the SNI ports $211_1$, $211_2$, ... and $211_n$. And, in the fourth embodiment, the path management table is called as "a path management table with first redundant policy". A path management table 227C of the multiplex control board 202C has the path management table with first redundant policy, and the path management table 235C of each of the PON interface boards $203_1$C, $203_2$C, ... and $203_n$C has the extracted information of the path management table with first redundant policy corresponding to the own PON interface board. The fourth embodiment has a feature that there is a measure for avoiding the line disturbance that occurs at the non-concentrate SNI ports $211_1$, $211_2$, ... and $211_n$ of the PON interface boards $203_1$C, $203_2$C, ... and $203_n$C, that is, a bypass is provided within the OLT 201C.

FIG. 21 is an explanatory view showing the table format of the path management table with first redundant policy in this embodiment. In the path management table with first redundant policy 711 of this embodiment, comparing with the PON interface board path management table 241 of the first embodiment as shown in FIG. 4, the data indicating whether a first redundant operation mode 712 is set to ON or OFF is added. Thereby, the OLT 201C can perform the path control using the first redundant operation mode 712. This information (ON or OFF) is set by the NMS/CLI terminal 214 in an initialization process.

Figure 22:
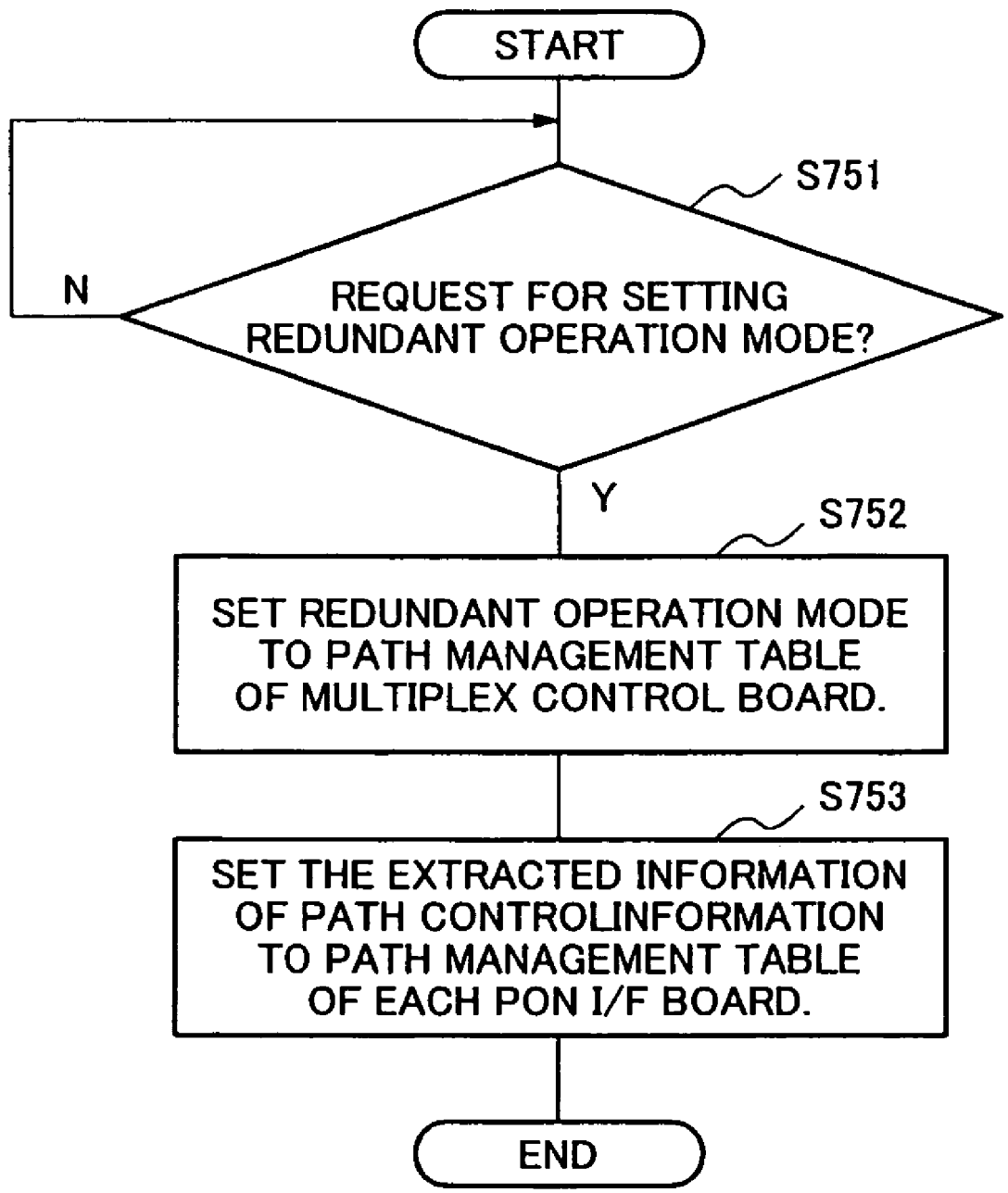
FIG. 22 is a flowchart showing an initialization process of the OLT by the NMS/CLI concerning the setting of a redundant operation mode 712 according to the fourth embodiment.

FIG. 22 is a flowchart showing the initialization process for the OLT by the NMS/CLI terminal to set the first redundant operation mode 712 according to the fourth embodiment. The OLT 201C monitors the reception of a request for setting the first redundant operation mode from the NMS/CLI terminal 214 (step S751). If the request for setting the first redundant operation mode is received (Y at step S751), this mode setting is performed for the path management table with first redundant policy 711 in the path management table 227C (step S752). Thereafter, the path control information corresponding to each PON interface board 203C is extracted from the path management table 227C, and set in the path management table 235C of each PON interface board (step S753). The initialization process for other items (card number, card type, path class) in the path management table with first redundant policy 711 is the same as already described in the initialization process for the PON interface board path management table 241 according to the first embodiment, as shown in FIG. 3, and its illustration is omitted.

When the NMS/CLI terminal 214 has performed the initialization process as described above, the path management table with first redundant policy 711 as shown in FIG. 21 is constructed in the path management table 227C. Also, the path management table 235C of each PON interface board 203C has the path management information corresponding to the card number 242 of the own PON interface board as the extracted information of the path management table with first redundant policy 711.

The data communication path from the network to the subscriber terminal in the fourth embodiment is the same as that of the first embodiment. Also, the data communication path from the subscriber terminal to the network using the path class information 244 is the same as that of the first embodiment.

In the fourth embodiment, a switching function for the data communication path at the time of line disturbance is newly defined. For example, when a line disturbance as indicated by the sign×occurs at the SNI port $211_n$ of the OLT 201C as shown in FIG. 19, the data packets to be output from the SNI port $211_n$ are switched to be output from the SNI port 211 of the multiplex control board 202C.

Figure 23:
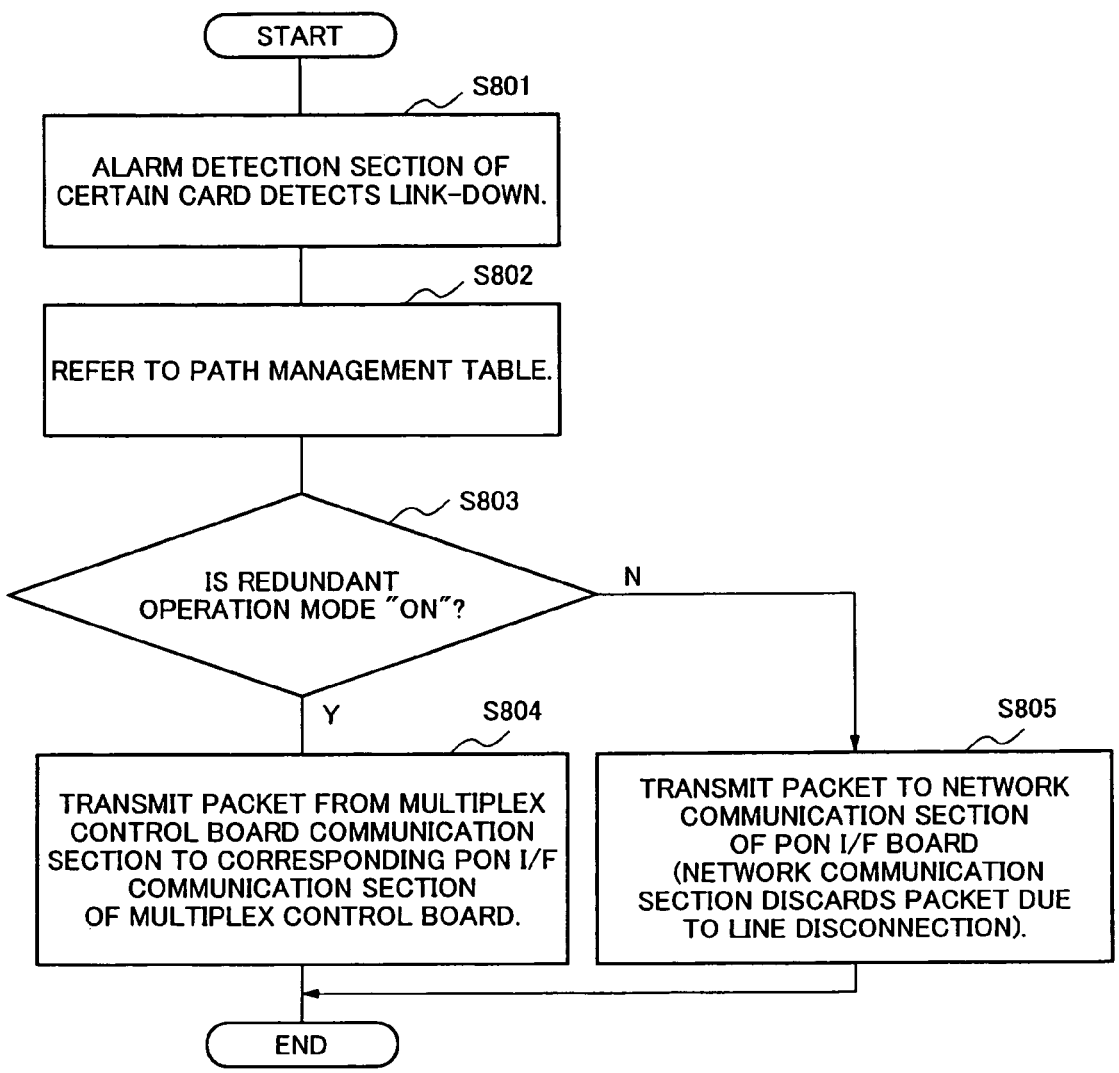
FIG. 23 is a flowchart showing the flow of a process where the line disturbance occurs according to the fourth embodiment.

FIG. 23 is a flowchart showing a process where the line disturbance occurs at the SNI port $211_n$ of the PON interface board $203_nC$ as shown in FIG. 19 or 20. It is assumed that any of the alarm detection sections $701_1$, $701_2$, ... and $701_n$ in the PON interface boards $203_1C$, $203_2C$, ... and $203_nC$ detects a line abnormality such as a link down at the corresponding SNI port (step S801). In this example, it is supposed that a service interruption state (line disturbance) of data transmission or reception is detected at the SNI port $211_n$. At this time, the path class information in the path management table 235C in the PON interface boards $203_nC$ is switched to refer to the path class 244 of the path setting table 721. That is, the information of the path class 244 is changed from "non-concentrate" to "concentrate". And this condition continues during the line disturbance is being detected by the alarm detection section $701_n$.

Under this condition, when the packet is transmitted from the subscriber terminal, the L2 switch section 234 of the PON interface boards $203_nC$ refers to the path management table 235C for establishing the switched path for the destination of the packet to be transmitted (step S802).

Herein, the state of first redundant operation mode 712 corresponding to the own PON interface board 203C is checked. If the first redundant operation mode is "ON" and the path class 244 is changed to "concentrate" (Y at step S803), the L2 switch section 234 of the PON interface boards $203_nC$ establishes the switched path for the destination of data packet to the multiplex control board communication section 231. And then, the packet is transmitted to the corresponding nth PON interface communication section $226_n$ of the multiplex control board 202C (step S804). The network communication section 225C of the multiplex control board 202C transmits the data packet, which has received from the nth PON interface communication section $226_n$ via the switched path established by the L2 switch section 223, to the network. At this time, the multiplex control board 202C is informed that the first redundant operation mode "ON" of the corresponding PON interface boards $203_nC$ is activated and the path class has been changed to "concentrate" by referring to the path management table 227C.

On the other hand, if the first redundant operation mode 712 is set to "OFF" (N at step S803), the L2 switch section 234 of the PON interface board 203C does not perform the switching operation as described above even if the line disturbance occurs. Therefore, the L2 switch section 234 of the PON interface board 203C establishes the switched path to transfer the data packet to the network communication section 232C of the own PON interface board 203C. At this time, the network communication section 232C, which has the information that the line disturbance is being detected by the alarm detection section 701, discards its data packet (step S805).

When the line disturbance is restored, the path class information in the path management table 235C of the PON interface boards $203_nC$ is referred to as the initial value without referring to the path setting table 721. That is, the information of the path class 244 is changed from "concentrate" to "non-concentrate" and restored to its original state. Thereby, the data is transmitted from the subscriber terminal to the network via the path in the initial state.

FIG. 19 shows a packet transmission or reception path where the line disturbance occurs at the SNI port $211_n$, in which the first redundant operation mode 712 in the path management table with first redundant policy is set to "ON". As shown in FIG. 19, an alternate path 731 is concentrated with the other "concentrate" paths $732_1$ and $732_2$, whereby the communication is performed with the network via the SNI port 211. In this way, in this embodiment, the redundant configuration is taken such that the communication path is concentrated in the SNI port 211 of the multiplex control board 202C when the line disturbance occurs at the SNI port $211_{n-1}$ and $211_n$ which are initially "non-concentrate". Accordingly, there is the effect that the reliability of the optical access network is improved.

Exemplary Embodiment 5

Figure 24:
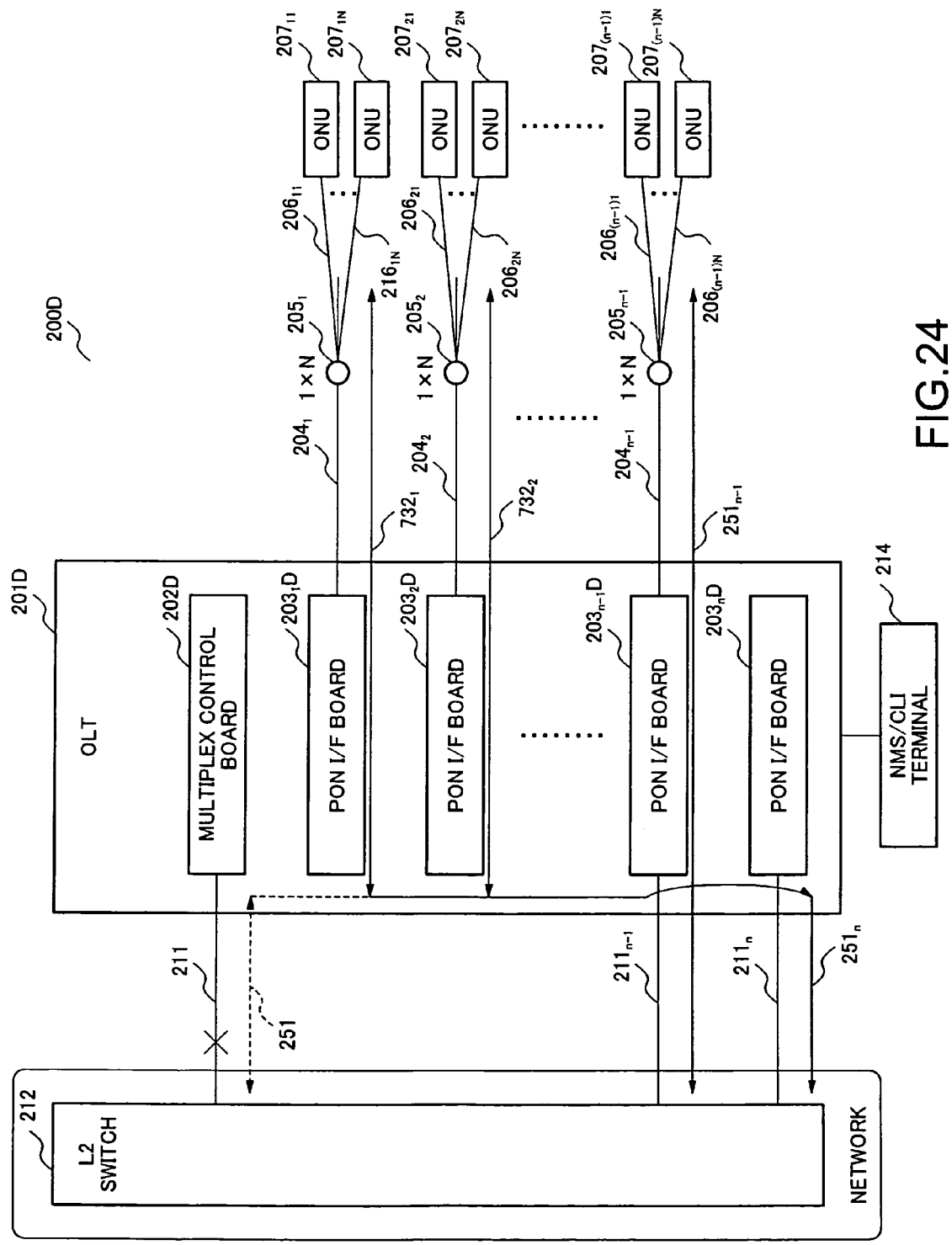
FIG. 24 is a system block diagram representing the essence of an optical access network according to a fifth embodiment of the present invention.

FIG. 24 is a system block diagram representing the essence of an optical access network according to a fifth embodiment of the present invention. In the optical access network 200D according to the fifth embodiment as shown in FIG. 24, the same parts are designated by the same reference numerals or signs as in the optical access network 200 according to the first embodiment as shown in FIG. 1, and the explanation of the same parts is omitted properly. In the optical access network 200D according to the fifth embodiment, a multiplex control board 202D in an OLT 201D and n PON interface boards $203_1D$, $203_2D$, . . . and $203_nD$ are slightly different from the multiplex control board 202 and n PON interface boards $203_1$, $203_2$, . . . and $203_n$ according to the first embodiment. Other points are the same as in the first embodiment.

Figure 25:
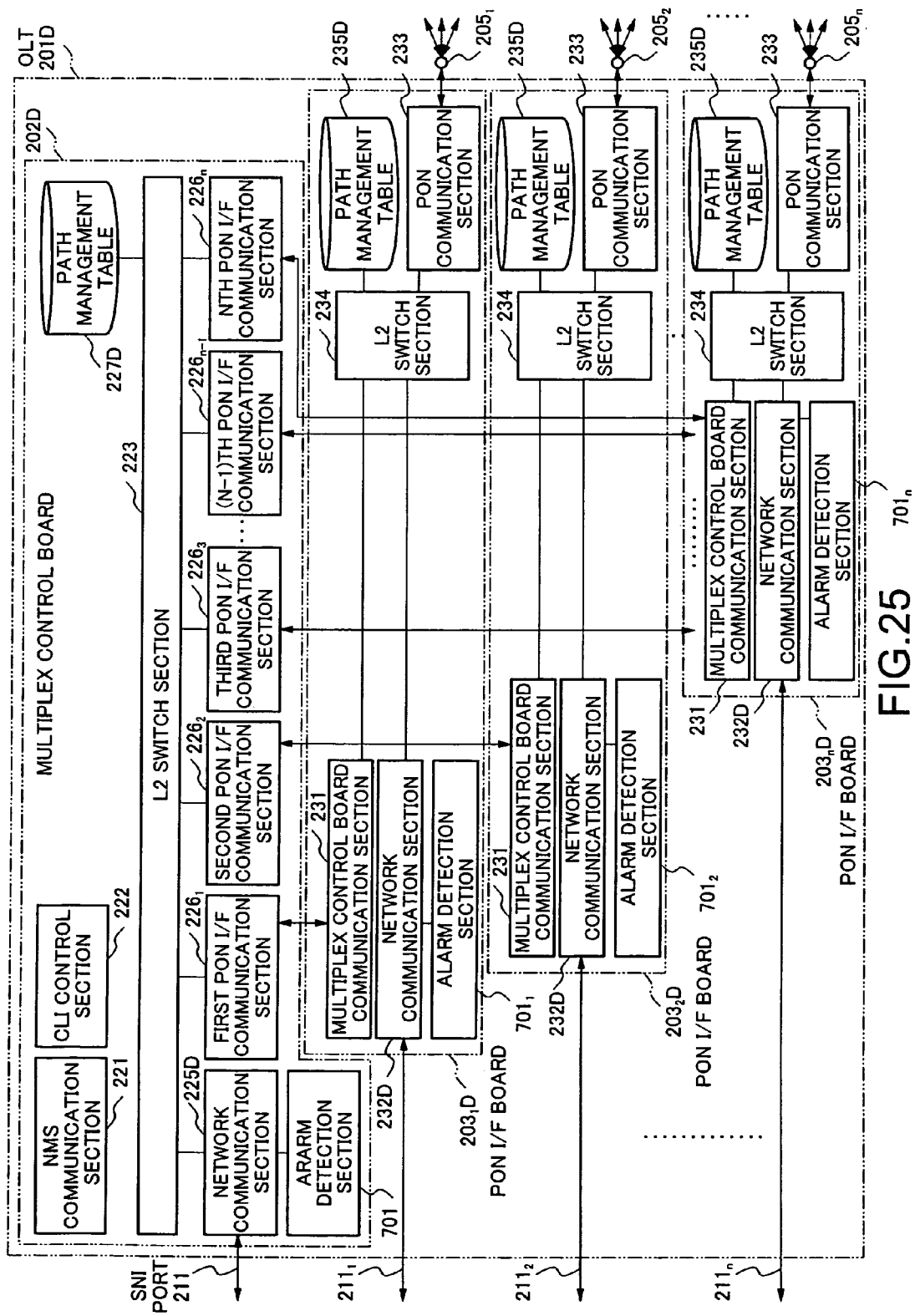
FIG. 25 is a block diagram representing the specific configuration of the OLT according to the fifth embodiment.

FIG. 25 is a block diagram representing the specific configuration of the OLT 201D according to this embodiment. In the fifth embodiment, the path management table is called as "a path management table with second redundant policy". The path management table with second redundant policy 711D held in a path management table 227D of the multiplex control board 202D is basically the same as the path management table with first redundant policy 711 according to the fourth embodiment as shown in FIG. 21, but a path class parameter "protection" is further defined, as will be described later. Also, a path management table 235D of each PON interface board 203D holds the extracted information of the path management table 227D corresponding to the own PON interface board.

FIG. 26 is an explanatory view showing the table format of the path management table with second redundant policy for use in the fifth embodiment. As the parameters of the path class 244 in the path management table with second redundant policy 711D, besides "concentrate" and "non-concentrate" in the fourth embodiment as shown in FIG. 21, "protection" is defined. The other points are substantially the same as the path management table with first redundant policy 711 of the fourth embodiment.

The optical access network 200D of the fifth embodiment has a feature that there is a measure for avoiding the line disturbance that occurs at the SNI ports 211 of the multiplex control board 202D, that is, a bypass is provided in the OLT 201D, as compared with the optical access network of the fourth embodiment.

The second redundant operation mode of the path management table with second redundant policy 711D is used to indicate whether or not the bypass in the OLT 201D is effective to secure the data communication path when the line disturbance has occurred at the SNI port.

When the second redundant operation mode 712D is "ON" and the line disturbance occurs at the SNI port $211_x$ of the PON interface board $203_xD$, the packet data to be passed through the PON interface board $203_xD$ is transferred to the multiplex control board 202D which forms a bypass to the network via the SNI port 211, and the packet data is temporarily concentrated in the multiplex control board 202D. When the second redundant operation mode 712D is "OFF" and the line disturbance occurs at the SNI port $211_x$ of the PON interface board $203_xD$, the packet data passing through the PON interface board $203_xD$ is not transferred to the multiplex control board 202D, and the data is interrupted. Also, if the path class for the specific PON interface board $203_xD$ is set as "protection", the PON interface board $203_xD$ with "protection" designated is specified as the redundant communication path when the line disturbance occurs at the SNI port 211 of the multiplex control board 202D. The packet communication in the concentrate mode is prevented from being interrupted by using the PON interface board $203_xD$ which provides a redundant SNI port as the bypass, when the line disturbance occurs at the SNI port 211 of the multiplex control board 202D.

Figure 27:
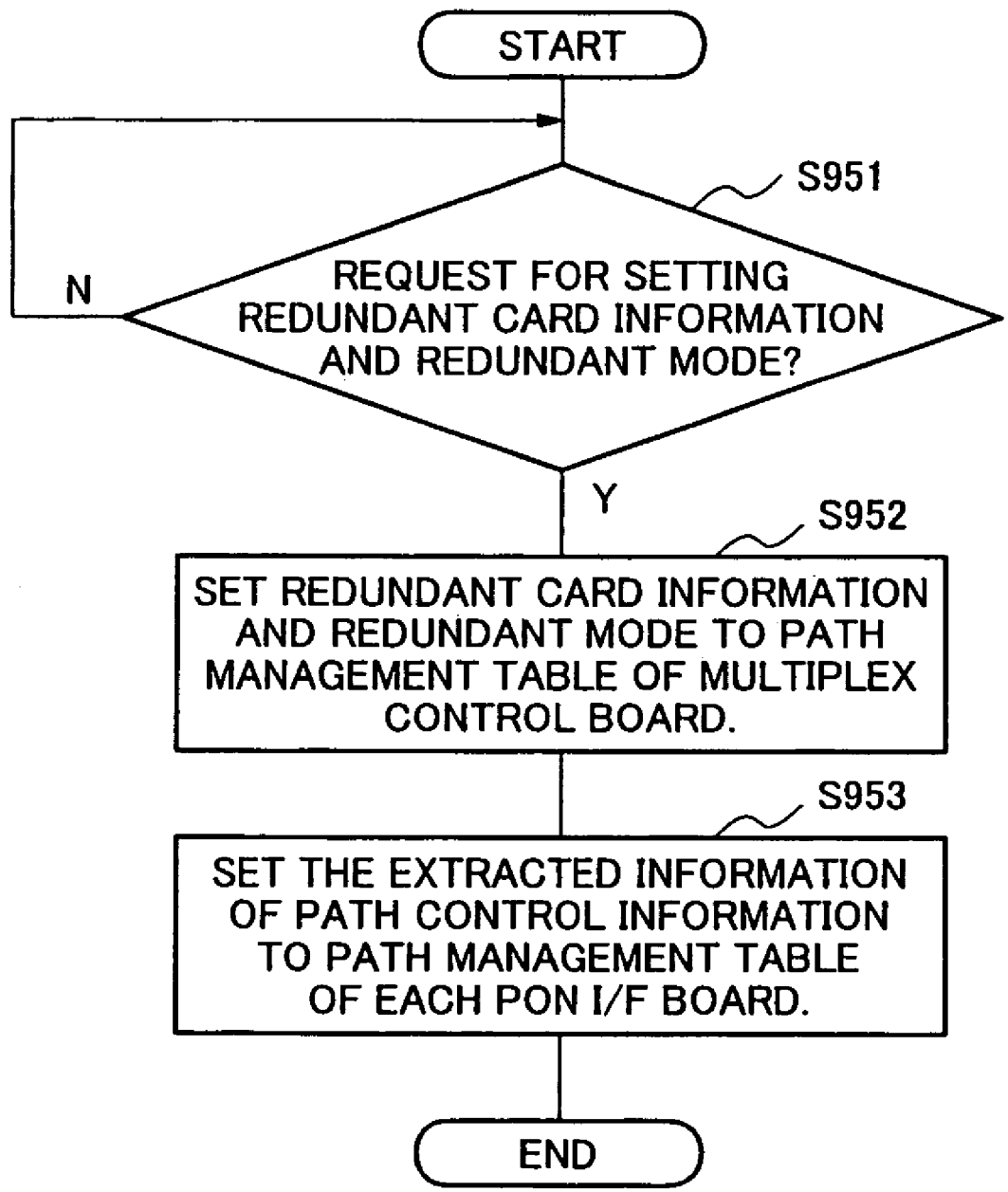
FIG. 27 is a flowchart showing an initialization process of the OLT by the NMS/CLI in the fifth embodiment.

FIG. 27 is a flowchart showing an initialization process for the OLT by the NMS/CLI terminal to set the second redundant operation mode 712D in according to the fifth embodiment. The OLT 201D monitors the reception of a request for setting the redundant card information and the second redundant operation mode from the NMS/CLI terminal 214 (step S951). If the request for setting the redundant card information and the second redundant operation mode is received (Y at step S951), the redundant card information and the second redundant operation mode is set in the path management table with second redundant policy 711D in the path management table 227D (step S952). Thereafter, the information corresponding to the PON interface board $203_1D, 203_2D, \ldots$ and $203_nD$ is extracted from the path management table 227D, and the path control information corresponding to each PON interface board is set in the path management table 235D of each PON interface board (step S953). The initialization process for other items (card number, card type, path class) in the path management table with second redundant policy 711D is the same as already described in the initialization process for the PON interface board path management table 241 in the first embodiment, as shown in FIG. 3, and its illustration is omitted.

Thereby, the path management table with second redundant policy 711D is constructed in the path management table 227D as shown in FIG. 25, and the extracted information from the path management table 227D corresponding to the own PON interface board is set in the path management table 235D of the PON interface board $203_1D, 203_2D, \ldots$ and $203_nD$.

The data communication path from the network to the subscriber terminal in the fifth embodiment is the same as that of the first embodiment of the present invention. However, when the line disturbance as indicated by the sign×occurs at the SNI port 211 of the OLT 201D, the L2 switch 212 on the network side shown in FIG. 24 switches the path for transmitting the data packet from the SNI port 211 to the SNI port $211_n$. Therefore, a path switching function at the time of line disturbance is newly defined. Also, the data communication path control from the subscriber terminal to the network using the path class information 244 is the same as in the first embodiment.

Thus, the operation where the line disturbance occurs at the SNI port 211 of the multiplex control board 202D will be described below.

Figure 28:
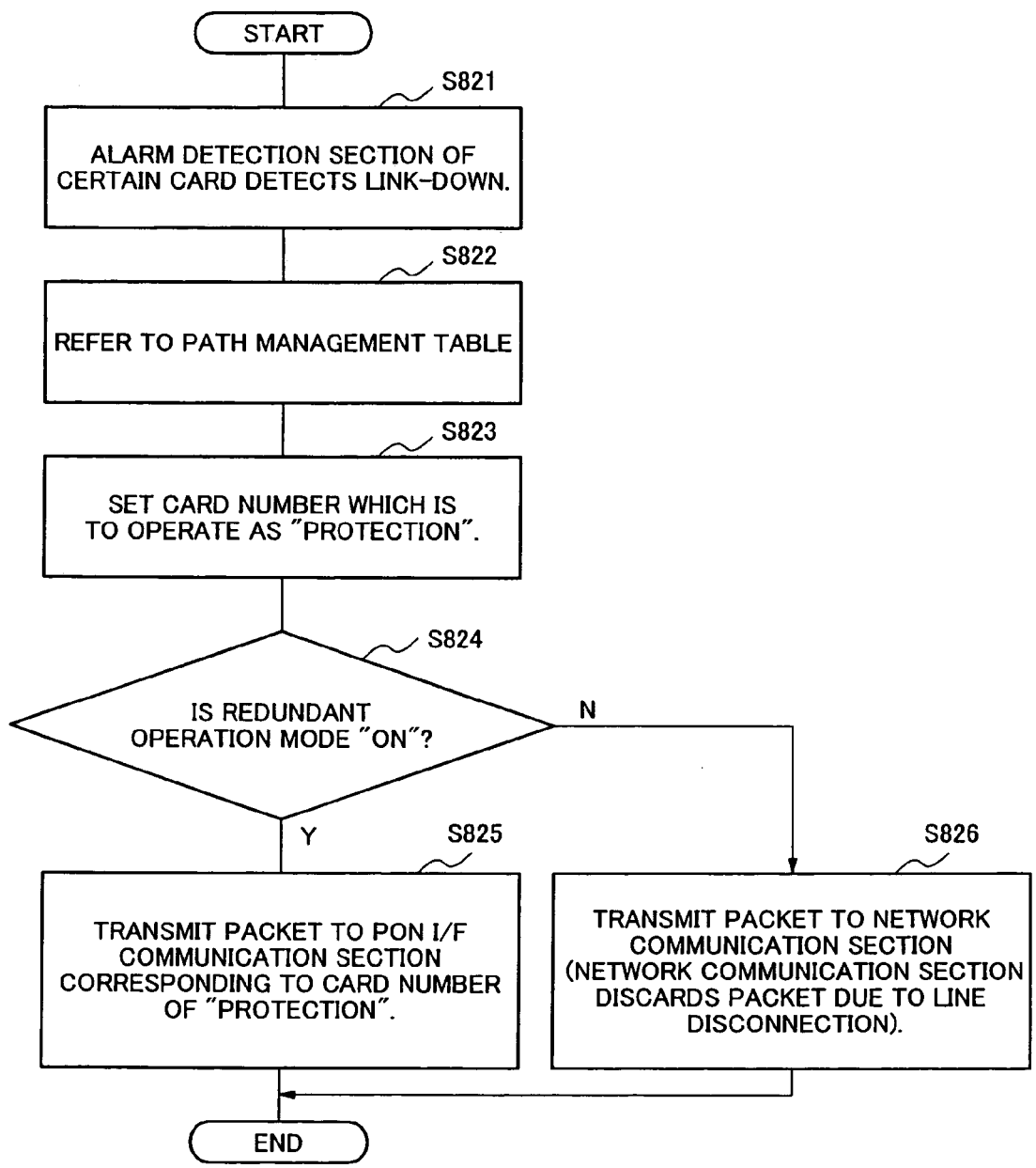
FIG. 28 is a flowchart showing the flow of a process where the line disturbance occurs at the SNI port of the multiplex control board according to the fifth embodiment.
Figure 29:
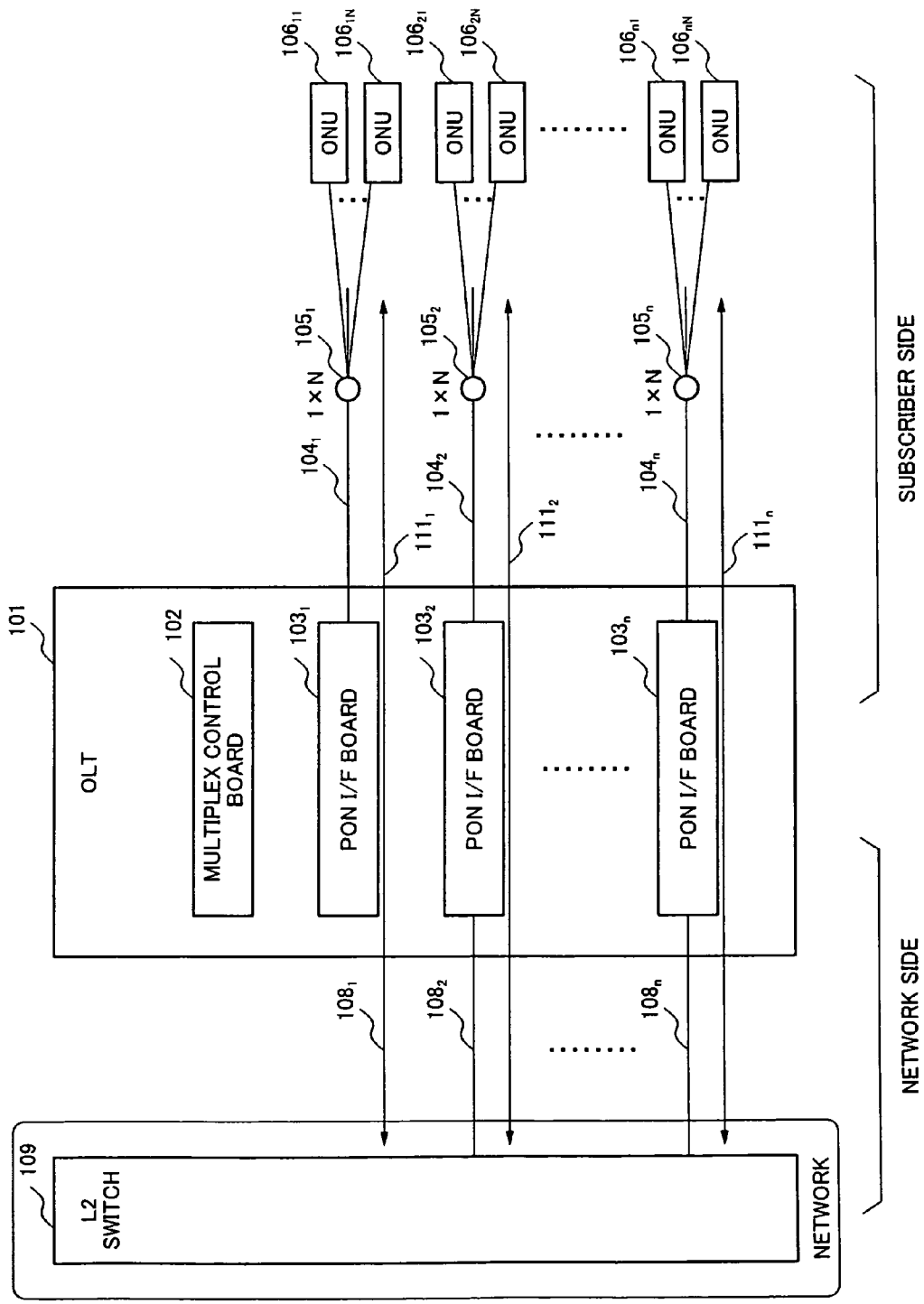
FIG. 29 is a system block diagram representing the essence of an example of the conventional optical access network of non-concentrate type.
Figure 30:
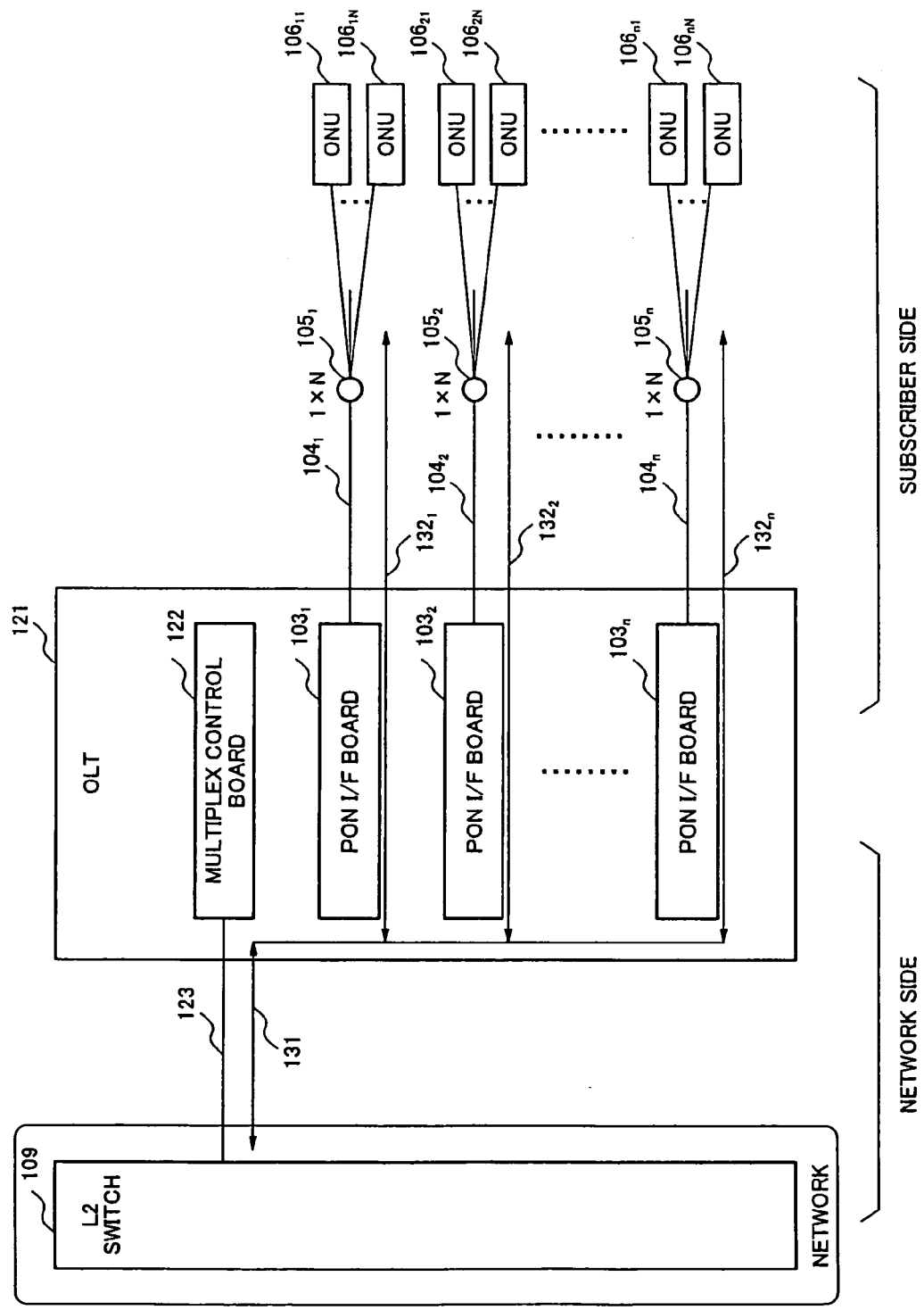
FIG. 30 is a system block diagram representing the essence of an example of the conventional optical access network of concentrate type.

FIG. 28 is a flowchart showing a process where the line disturbance occurs at the SNI port for concentration of the multiplex control board 202D.

First of all, it is assumed that an alarm detection section 701 of the multiplex control board 202D has detected a line abnormality such as a link down at the SNI port 211 (step S821). The multiplex control board 202D picks up the PON interface board 203D for which the path class 244 is set to "protection" by referring to the path management table with second redundant policy 711D (step S822). In the path management table with second redundant policy 711D as shown in FIG. 26, the PON interface board $203_nD$ has the pass class 244 of "protection", and the PON interface board $203_nD$ is selected. And as for the own path class which is corresponding to the card number 242 of "0" in the path management table with second redundant policy 711D, the redundant path class 841 is set as "Card n" which is the card number to operate as the redundant path (step S823). This means that the PON interface board $203_nD$ operates as the redundant path indicated by "protection", and the card number "n" of the PON interface board $203_nD$ is set.

Next, when the second redundant operation mode is "ON" (Y at step S824), the L2 switch section 223 of the multiplex control board 202D establishes the switched path to transmit the data packet for concentration to the PON interface communication section $226_n$ corresponding to "Card n" (step S825). And the PON interface board $203_nD$ receives the data packet from the multiplex control board 202D via the multiplex control board communication section 231. The data packet received at the PON interface board $203_nD$ is transmitted to the network communication section 232D from the multiplex control board communication section 231 via the switched path established by the L2 switch section 234 of the PON interface board $203_nD$, and then, the data packet is output from the network communication section 232D to the network via the SNI port $211_n$.

On the other hand, when the second redundant operation mode 712D of the path management table with second redundant policy 711D is "OFF" (N at step s824), the L2 switch section 223 of the multiplex control board 202D establishes the switched path to transfer the data to the network communication section 225D. At this time, the network communication section 225D of the multiplex control board 202D has the information that the line disturbance is being detected at the SNI port 211 of the OLT 201D. Accordingly, the data packet is discarded in the network communication section 225D (step S826).

When the line disturbance at the SNI port 211 has restored, the path class 244, which is corresponding to the multiplex control board 202D, in the path management table with second redundant policy 711D is restored (i.e., returns from "Card n" to the original "concentrate"). Thereby, the data communication path from the subscriber terminal to the network returns to the normal path of the SNI port 211.

In this way, in this embodiment, when the fault occurs at the SNI port 211 that is used as the "concentrate" port, the communication path of the data packet is switched to the SNI port 211n of the PON interface board $203_nD$ that is set as "protection" among the PON interface boards $203_1D, 203_2D, \ldots$ and $203_nD$. Accordingly, the redundant configuration for packet transmission to the network is formed, whereby there is the effect that the reliability of the optical access network is improved.

In the first to fifth embodiments as described above, the present invention has been described taking optical access network with the GEPON or EPON as an example, but the present invention is not limited to these embodiments. That is, it is obvious that the present invention may be applied to other communication systems in which the network and the subscriber terminal are connected via the OLT.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. An Optical Line Terminal (OLT) in an optical access network connecting a plurality of subscriber terminals to a network, comprising:

a multiplex control unit for providing a communication path to be used commonly for transmitting data signals for said plurality of subscriber terminals to communicate with said network;

a plurality of optical network interface units, each accommodates said plurality of subscriber terminals and provides either a first path connected to said network for transmitting said data signals individually or a second path connected to said multiplex control unit for transmitting said data signals to said network commonly with data signals from other subscriber terminals accommodated in other optical network interface unit; and a path selection control section, which determines for every optical network interface unit to select either said first path or said second path on the basis of path class information in a path management table in which respective path class information for every optical network interface unit have been predetermined and set.

2. The OLT in the optical access network according to claim 1, wherein said path management table includes path selection policy information corresponding to the subscriber terminal accommodated in each optical network interface unit, and said path class information is associated with said path selection policy information in said path management table.

3. The OLT in the optical access network according to claim 2, wherein said path selection policy information is any one of a VLAN (Virtual Local Area Network) class corresponding to said subscriber terminal, a logical link identifier (Logical Link IDentifier), an ONU (Optical Network Unit) class and a type of protocol of the data signal of said subscriber terminal.

4. The OLT in the optical access network according to claim 3, wherein said optical network interface unit comprising:

An optical network communication section, which communicates with said subscriber terminal accommodated in said optical network interface unit, extracts said path selection policy information from data signal transmitted from said subscriber terminal, and selects either said first path or said second path for transmitting said data signal by retrieving said path class information from said path management table using said extracted path selection policy information as a key index.

5. The OLT in the optical access network according to claim 1, said multiplex control unit further comprising:

at least one server for performing necessary process of a network service for said subscriber terminal;

wherein said path management table includes server function validity information which specifies validity of use of said server for said subscriber terminals accommodated in each optical network interface unit, and said path class information is associated with said server function validity information in said path management table.

6. The OLT in the optical access network according to claim 5, wherein said server is any one of an authentication server for performing an authentication process for said subscriber terminal and a protocol processing server for implementing the IP multicast services.

7. The OLT in the optical access network according to claim 6, wherein said path selection control section determines for every optical network interface unit to select either said first path or said second path on the basis of a combination of said path class information and said server function validity information in said path management table corresponding to each optical network interface unit.

8. The OLT in the optical access network according to claim 1, said optical network interface unit further comprising:

a fault detection section for detecting a fault at a network communication section which connects said first path to said network; and wherein, said path management table includes a first redundant mode operation information, which specifies whether or not said second path is to be referred to as a redundant path at a time when said fault is being detected at said fault detection section, corresponding to said optical network interface unit.

9. The OLT in the optical access network according to claim 1, said multiplex control unit further comprising:

a fault detection section for detecting a fault at a network communication section which connects said communication path to be used commonly for said plurality of subscriber terminals to said network; and wherein, said path management table includes a protection information in said path class information, which specifies one of optical network interface units as a spare card of said multiplex control unit, and a second redundant mode operation information, which specifies whether or not said optical network interface unit specified by said protection information is to be used as said spare card at a time when said fault is being detected at said fault detection section.

10. A data signal sending method for use in an Optical Line Terminal (OLT) in an optical access network connecting a plurality of subscriber terminals to a network, comprising:

a data signal receiving step for receiving a data signal from a subscriber terminal at an optical network interface unit accommodating said subscriber terminal;

a table referring step for referring to a path management table, which includes path class information defining either a first path connected to said network for transmitting said data signal individually from said optical network interface unit or a second path connected to a multiplex control unit for transmitting said data signal to said network commonly with data signals from other subscriber terminals; and a path selecting step for selecting one of said first path and said second path depending on said path class information having been allocated to said optical network interface unit accommodating said subscriber terminal.

11. The data signal sending method for use in the OLT in the optical access network according to claim 10, wherein said path management table includes path selection policy information corresponding to the subscriber terminal, and said path class information is associated with said path selection policy information in said path management table, wherein said data signal receiving step method comprising:

a information extracting step for extracting information corresponding to said path selection policy information contained in said received data signal; and wherein said path selecting step includes a step for selecting one of said first path and said second path depending on said path class information corresponding to said path selection policy information.

12. The data signal sending method for use in the OLT in the optical access network according to claim 10, wherein said multiplex control unit includes at least one server for performing necessary process of a network service for said subscriber terminal, and wherein said path management table includes server function validity information which specifies validity of use of said server for said subscriber terminal accommodated in each optical network interface unit, and said path class information is associated with said server function validity information in said path management table, wherein said path selecting step comprising:

a path selection determination step for determining one of said first path and said second path to be selected on the basis of a combination of said path class information and said server function validity information in said path management table corresponding to each optical network interface unit.

13. The data signal sending method for use in the OLT in the optical access network according to claim 12, wherein said path selecting step further comprising:

a first internal path selecting step for selecting a first internal path in said multiplex control unit, which is provided for transmitting said data signal to said network commonly with data signals from other subscriber terminals after processing said data signal by said server, when said second path is determined by said path selection determination step according to the combination of information of said second path as said path class information and valid information of said server function validity information specified in said path management table corresponding to said subscriber terminal.

14. The data signal sending method for use in the OLT in the optical access network according to claim 12, wherein said path selecting step further comprising:

a second internal path selecting step for selecting a second internal path in said multiplex control unit, which is provided for sending back said data signal to said optical network interface unit accommodating said subscriber terminal after processing said data signal by said server, when said second path is determined by said path selection determination step according to the combination of information of said first path as said path class information and valid information of said server function validity information specified in said path management table corresponding to said subscriber terminal.

15. The data signal sending method for use in the OLT in the optical access network according to claim 10, wherein, said path management table includes a first redundant mode operation information, which specifies whether or not said second path is to be referred to as a redundant path at a time when a fault is being detected at said first path corresponding to said optical network interface unit, wherein said path selecting step further comprising:

a first redundant path selecting step for selecting said second path when said fault is being detected and said first redundant mode operation information specifies to refer to said redundant path.

16. The data signal sending method for use in the OLT in the optical access network according to claim 10, wherein said path management table includes a protection information in said path class information, which specifies one of optical network interface units as a spare card of said multiplex control unit, and a second redundant mode operation information, which specifies whether or not said optical network interface unit specified by said protection information is to be used as said spare card at a time when a fault is being detected at said multiplex control unit, wherein said method further comprising:

a second redundant path selecting step for selecting a data signal transmission path from said multiplex control unit to said optical network interface unit specified by said protection information for transmitting said data signal to said network when said fault is being detected and said second redundant mode operation information specifies said optical network interface unit is to be used as said spare card.

* * * * *